(12) United States Patent
Aso et al.

(10) Patent No.: US 11,394,736 B2
(45) Date of Patent: Jul. 19, 2022

(54) LOG OUTPUT DEVICE, LOG OUTPUT METHOD AND LOG OUTPUT SYSTEM

(71) Applicant: PANASONIC CORPORATION, Osaka (JP)

(72) Inventors: Tadaomi Aso, Saga (JP); Koji Muto, Fukuoka (JP); Yutaka Iyoki, Saitama (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 0 days.

(21) Appl. No.: 17/272,855

(22) PCT Filed: Sep. 2, 2019

(86) PCT No.: PCT/JP2019/034394
§ 371 (c)(1),
(2) Date: Mar. 2, 2021

(87) PCT Pub. No.: WO2020/050206
PCT Pub. Date: Mar. 12, 2020

(65) Prior Publication Data
US 2021/0320937 A1 Oct. 14, 2021

(30) Foreign Application Priority Data
Sep. 3, 2018 (JP) .............................. JP2018-164537

(51) Int. Cl.
*H04L 29/06* (2006.01)
*H04L 12/26* (2006.01)
(Continued)

(52) U.S. Cl.
CPC ...... *H04L 63/1425* (2013.01); *H04L 43/0817* (2013.01); *H04L 63/1441* (2013.01)

(58) Field of Classification Search
CPC ............. H04L 63/1425; H04L 43/0817; H04L 63/1441; G06N 5/003; G06F 21/552;
(Continued)

(56) References Cited

U.S. PATENT DOCUMENTS 9,516,053 B1 * 12/2016 Muddu ................. H04L 43/00
2014/0096181 A1 * 4/2014 Rivers .................... H04L 63/20
726/1
(Continued)

FOREIGN PATENT DOCUMENTS

JP 2003-006004 1/2003
JP 2003-091434 3/2003
(Continued)

OTHER PUBLICATIONS

International Search Report issued in International Patent Application No. PCT/JP2019/034394, dated Nov. 12, 2019, along with an English translation thereof.
(Continued)

*Primary Examiner* — Muhammad Raza
(74) *Attorney, Agent, or Firm* — Greenblum & Bernstein, P.L.C.

(57) ABSTRACT

A log output device includes a generation unit that generates a log indicating history information of execution of processing, a memory that stores a first list including first static information indicating that the processing is abnormal; a second list including second static information indicating that the processing is normal; and a third list including dynamic information to be used for determining the necessity of output of the log according to the log, and a selection unit that determines to output the generated log when the log has the first static information, and decides not to output the generated log when the log has the second static informa-
(Continued)

tion. The selection unit determines the necessity of output of the generated log on the basis of the log and the third list.

13 Claims, 22 Drawing Sheets

(51) Int. Cl.
*H04L 9/40* (2022.01)
*H04L 43/0817* (2022.01)

(58) Field of Classification Search
CPC .. G06F 21/55; G06F 11/3476; G06F 11/3065; G06F 11/3006; G06F 11/30
See application file for complete search history.

(56) References Cited

U.S. PATENT DOCUMENTS

| | | |
|---|---|---|
| 2015/0193618 A1 | 7/2015 | Takano et al. |
| 2017/0149802 A1* | 5/2017 | Huang ................. G06F 21/577 |
| 2017/0163670 A1* | 6/2017 | Manadhata ......... H04L 63/1441 |
| 2018/0027006 A1* | 1/2018 | Zimmermann ..... H04L 63/0227 726/11 |
| 2018/0041531 A1 | 2/2018 | Ikeda |
| 2018/0191729 A1* | 7/2018 | Whittle ................... H04L 67/02 |
| 2018/0191848 A1* | 7/2018 | Bhattacharya ...... H04W 12/126 |
| 2019/0173897 A1 | 6/2019 | Okano |

FOREIGN PATENT DOCUMENTS

| | | |
|---|---|---|
| JP | 2014-170327 | 9/2014 |
| JP | 5966076 | 8/2016 |
| WO | 2017/221667 | 12/2017 |

OTHER PUBLICATIONS

Written Opnion issued in International Patent Application No. PCT/JP2019/034394, dated Nov. 12, 2019, along with an English translation thereof.
Extended European Search Report issued in European Patent Application No. 19857961.7, dated Sep. 10, 2021.

* cited by examiner

FIG. 4B

| LOG TYPE | InfoID | DetailID | LOG BODY EXAMPLE |
|---|---|---|---|
| NORMAL-TYPE LOG | 0x1 | 0x8001~ 0x81ff | Access (Server): Network was disconnect with 192.168.137.11:22 |
| ABNORMAL-TYPE LOG | 0x2 | 0x8001~ 0x81ff | Suspicion of attack (Server): Cannot get user key |
| iptables LOG | 0x5 | 0x0001 | [ 5862.977393] IPT:IN=lo OUT= MAC=00:00:00:00:00:00:00:00:00:00:00:00:08:00 SRC=192.168.253.253 DST=192.168.253.253 LEN=84 TOS=0x00 PREC=0x00 TTL=64 ID=4460 PROTO=ICMP TYPE=0 CODE=0 ID=4313 SEQ=2 |
| Apache ACCESS LOG | 0x7 | 0x0001 | 192.168.24.1 - - [04/Aug/2016:23:34:09 -0700] "GET / HTTP/1.1" 200 3805 "-" "Mozilla/5.0 (Windows NT 10.0; WOW64) AppleWebKit/537.36 (KHTML, like Gecko) Chrome/51.0.2704.103 Safari/537.36" |
| Secure LOG | 0x8 | 0x0001 | sshd[4942]: Accepted password for admin from 192.168.24.1 port 52414 ssh2 |

FIG. 5A

| ORDER | COMPARISON ITEM | L1 | L2 | L3 |
|---|---|---|---|---|
| 1 | LOG ID | ○ | ○ | × |
| 2 | COUNTERPART IP ADDRESS AND PORT NUMBER | ○ | ○ | × |
| 3 | FACILITY | ○ | ○ | × |
| 4 | PRIORITY | ○ | ○ | × |
| 5 | LOG MESSAGE | ○ | × | × |
| 6 | Apache STATUS | ○ | ○ | × |
| 7 | COUNTERPART IP ADDRESS, PORT NUMBER, AND LOG ID | × | × | ○ |

LGB1 sshd[4942]: Accepted password for admin from 192.168.24.1 port 52414 ssh2

CASE OF NORMAL ACCESS 192.168.24.1 - - [04/Aug/2016:23:34:09 -0700] "GET / HTTP/1.1" 200 3805 "-" "Mozilla/5.0 (Windows NT 10.0; WOW64) AppleWebKit/537.36 (KHTML, like Gecko) Chrome/51.0.2704.103 Safari/537.36"

LGB2

FIG. 9B

CASE OF ERRONEOUS ACCESS

LGB3

192.168.24.1 - - [04/Aug/2016:23:34:09 -0700] "GET / HTTP/1.1" 400 3805 "-" "Mozilla/5.0 (Windows NT 10.0; WOW64) AppleWebKit/537.36 (KHTML, like Gecko) Chrome/51.0.2704.103 Safari/537.36"

FIG. 10A

| LOG TYPE | Detail ID | LOG MESSAGE EXAMPLE | TIME OF OCCURRENCE OF EVENT |
|---|---|---|---|
| NORMAL-TYPE LOG | 0x8001 | Access(Server) : Network is connected with 192.168.137.11:22 | CONNECTION TO NETWORK |
| | 0x8002 | Access(Server) : Network was disconnect with 192.168.137.11:22 | DISCONNECTION FROM NETWORK |
| | 0x8003 | Access(Server) : Receive data from 192.168.137.11:22 len = 1000 | DATA RECEPTION |
| | 0x8004 | Access(Server) : send data to 192.168.137.11:22 len = 1000 | DATA TRANSMISSION |

LOG OUTPUT DEVICE, LOG OUTPUT METHOD AND LOG OUTPUT SYSTEM

TECHNICAL FIELD

The present disclosure relates to a log output device, a log output method, and a log output system.

BACKGROUND ART

An IoT (Internet of Things) device is a device that has a processor and an operation device and can transmit data or information acquired by the operation device according to an instruction from the processor to a communication partner that is connected via a communication network (e.g., Internet). For example, the operation device is a sensing device for detecting a prescribed event or parameter or a shooting device for shooting a subject existing in its angle of view. When the operation device has performed a certain event, an IoT device generates a log indicating history information relating to the execution of the event or a communication with another device like an information processing device such as a PC (personal computer) does.

Patent document 1 discloses a malignant communication log detection device which compresses a first character string indicating a feature of a communication log that is known to be malignant or benign and a second character string that is a combination of the first character string and a character string indicating a feature of a target communication log and calculates a score to be used for judging whether the target communication log is malignant or benign on the basis of a data size of a compressed first character string and a data size of a compressed second character string. This malignant communication log detection device judges whether the target communication log is malignant or benign on the basis of the calculated score and a prescribed parameter.

CITATION LIST

Patent Literature

Patent document 1: WO 2017/221667

SUMMARY OF INVENTION

Technical Problems

Recently, SIEM (Security Information and Event Management) has come to be known as a security technology for judging whether an information processing device such as a PC is being exposed to a danger (e.g., whether it is receiving a cyber attack from a third party) by analyzing its logs (e.g., communication history). A SIEM-compatible apparatus can detect an attack to an information processing device or its sign early by collecting plural logs sent from the information processing device and analyzing each of the collected logs and inform a manager of it.

With the spread of IoT devices as mentioned above, it is conceivable that the target range of SIEM services will include not only information processing devices such as PCs but also IoT devices. In this case, since logs will be sent to a SIEM service from a very large number of IoT devices, the number of logs to be analyzed by the SIEM service will increase enormously to increase its processing load. That is, if IoT devices which are installed in a larger number than information processing devices such as PCs report (transmit) all logs to a SIEM service, not only does the traffic of a communication network increase but also the analysis processing of the SIEM service becomes complex.

Furthermore, the processors installed in IoT devices are lower in performance than those installed in information processing devices such as PCs. Thus, if the number of logs to be output becomes too large, adverse effects may occur in the fundamental function relating to ordinary processing of each IoT device itself to possibly cause trouble such as processing delay. However, the above-described Patent document 1 does not take into consideration technical countermeasures for lowering a traffic increase that will occur when each IoT device necessarily sends many logs to a SIEM service and for suppressing log outputs from each IoT device.

The concept of the present disclosure has been conceived in view of the above circumstances and has an object of providing a log output device, a log output method, and a log output system which properly select logs to be reported to a SIEM service from logs generated as a processing history and thereby suppress adverse effects on a fundamental function relating to ordinary processing and a traffic increase of a communication network.

Solution to Problem

The disclosure provides a log output device including a generation unit that generates a log indicating history information of execution of processing; a memory that stores a first list including first static information indicating that the processing is abnormal, a second list including second static information indicating that the processing is normal, and a third list including dynamic information to be used for determining the necessity of output of the log according to the log; and a selection unit that determines to output the log generated by the generation unit when the log has the first static information, and decides not to output the log generated by the generation unit when the log has the second static information, wherein the selection unit determines the necessity of output of the log generated by the generation unit on the basis of the log and the third list.

The disclosure also provides a log output method employed in a log output device, including the steps of generating a log indicating history information of execution of processing; storing, in a memory, a first list including first static information indicating that the processing is abnormal, a second list including second static information indicating that the processing is normal, and a third list including dynamic information to be used for determining the necessity of output of the log according to the log; and determining to output the log generated by the generation unit when the log has the first static information, and deciding not to output the log generated by the generation unit when the log has the second static information; and determining the necessity of output of the log generated by the generation unit based on the log and the third list.

The disclosure further provides a log output system in which a log output device and a server which analyzes a log sent from the log output device are communicatable with each other, wherein the log output device generates a log indicating history information of execution of processing; stores, in a memory, a first list including first static information indicating that the processing is abnormal, a second list including second static information indicating that the processing is normal, and a third list including dynamic information to be used for determining the necessity of output of the log according to the log; and determines to output the log generated by the generation unit when the log has the first static information, and decides not to output the log generated by the generation unit when the log has the second static information; and determines the necessity of output of the log generated by the generation unit based on the log and the third list.

Advantageous Effects of Invention

The disclosure makes it possible to properly select logs to be reported to a SIEM service from logs generated as a processing history and thereby suppress adverse effects on a fundamental function relating to ordinary processing and a traffic increase of a communication network.

BRIEF DESCRIPTION OF DRAWINGS

FIG. 4B is a table showing example log types.

FIG. 5A is a table showing sets of example items that constitute a black list, a white list, and a dynamic list, respectively.

FIG. 9B is a drawing showing an example of a log generated when an erroneous access is made to a web server.

FIG. 10A is a table showing example logs having respective DetailID's of a normal-type log.

DESCRIPTION OF EMBODIMENT

Figure 1:
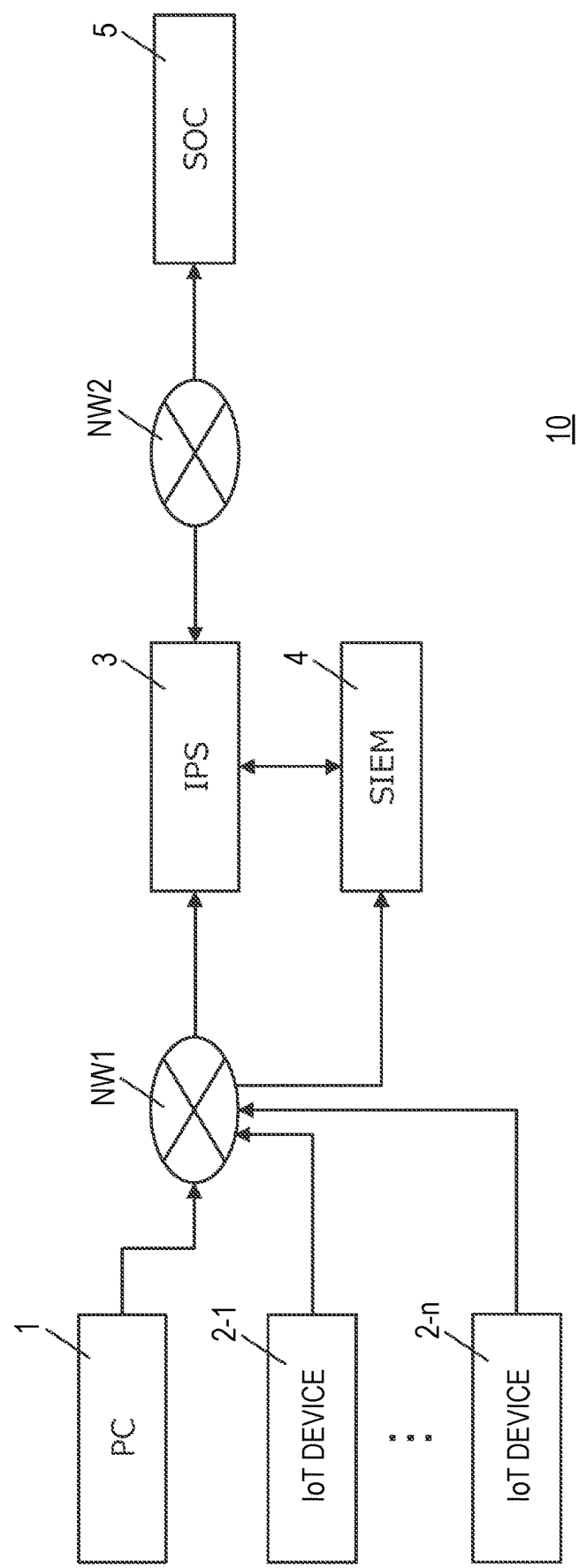
FIG. 1 is a diagram showing an example system configuration of a log output system 10 according to a first embodiment.

An embodiment as a specific disclosure of a log output device, a log output method, and a log output system according to the present disclosure will be hereinafter described in detail by referring to the drawings when necessary. However, unnecessarily detailed descriptions may be avoided. For example, detailed descriptions of already well-known items and duplicated descriptions of constituent elements having substantially the same ones already described may be omitted. This is to prevent the following description from becoming unnecessarily redundant and thereby facilitate understanding of those skilled in the art. The following description and the accompanying drawings are provided to allow those skilled in the art to understand the disclosure thoroughly and are not intended to restrict the subject matter set forth in the claims.

An IoT device (refer to the above statement) as an example of a log output device according to the disclosure will be described below. An IoT device as an example of the log output device according to a first embodiment generates a log indicating history information of execution of certain processing of the IoT device. The IoT device stores, in a memory (e.g., flash memory 24), a first list (e.g., black list) including first static information indicating that the processing is abnormal, a second list (e.g., white list) including second static information indicating that the processing is normal, and a third list (e.g., dynamic list) including dynamic information to be used for determining the necessity of output of the log according to the log. The IoT device decides to output the generated log if the log has the first static information, and decides not to output the generated log if the log has the second static information. Furthermore, the IoT device determines the necessity of output of the generated log on the basis of the log and the third list (refer to the above statement). It is noted that the log output device according to the disclosure is not limited to an IoT device as described above and may be a computer such as a PC.

FIG. 1 is a diagram showing an example system configuration of a log output system 10 according to the first embodiment. The log output system 10 is configured so as to include a PC 1, plural IoT devices 2-1 to 2-*n* (n: integer that is larger than or equal to 2), an IPS 3, a SIEM 4, and an SOC 5. The PC 1, n IoT devices 2-1 to 2-*n*, IPS 3, and SIEM 4 are connected to each other so as to communicate with each other over a network NW1. The IPS 3 and the SOC 5 are connected to each other so as to communicate with each other over a network NW2. Each of the networks NW1 and NW2 is a wireless network, for example, a wireless LAN (local area network) such as Wi-Fi (registered trademark), a fourth generation mobile communication system (what is called 4G), or a fifth generation mobile communication system (what is called 5G). Each of the networks NW1 and NW2 may be a wired network.

The PC 1 is an ordinary personal computer equipped with a processor having a high information processing ability and is a high-end specification information processing device. Although no drawing showing a specific example internal configuration is provided, the PC 1 is configured so as to include a processor, memories such as a RAM (random access memory) and a ROM (read-only memory), an HDD (hard disk drive), and a communication network I/F (interface). The processing ability of the processor provided in the PC 1 need not be of a high-end specification as long as it is superior than that of a processor 23 (see FIG. 2) provided in each of the IoT devices 2-1 to 2-*n* (described later). When the PC 1 has performed certain processing (e.g., execution of an application or a communication), its processor generates a log indicating execution history information of the processing. The PC 1 sends the generated log to the SIEM 4 via the network NW1 and the IPS 3 or only via the network NW1.

As described above, each of the IoT devices 2-1 to 2-*n* is a low-end specification electronic device that has at least a processor 23 and an operation unit 26 and can transmit data or information acquired by the operation unit 26 according to an instruction from the processor 23 to a communication counterpart connected to it via a network (e.g., network NW1). Furthermore, each of the IoT devices 2-1 to 2-*n* can communicate data or information acquired by the operation unit 26 to a cloud server (not shown) over the network NW1 and drive an actuator provided in itself according to control data transmitted from the cloud server. For example, each of the IoT devices 2-1 to 2-*n* is a surveillance camera, a payment terminal, a body-worn camera, an intercom, a multifunction machine, a smart meter, a PLC (programmable logic controller), or a gateway box.

As in the case of the PC 1, when each of the IoT devices 2-1 to 2-*n* has performed certain processing (e.g., a communication or processing performed by the operation unit 26) or received an attack by malignant virus software such as malware, the processor 23 or the operation unit 26 generates a log indicating execution history information of the processing or history information indicating the reception of an attack by the virus software. Each of the IoT devices 2-1 to 2-*n* determines the necessity of output (e.g., transmission to the SIEM 4) of the generated log mainly using three kinds of lists (more specifically, black list L1, white list L2, and dynamic list L3) and outputs the log (for example, to the SIEM 4) only if judging that the log should be output. In other words, in the first embodiment, each of the IoT devices 2-1 to 2-*n* sorts out output target logs by determining the necessity of output of each log on its own using the above-mentioned lists instead of necessarily outputting a log generated every time processing is performed. With this measure, each of the IoT devices 2-1 to 2-*n* can output only necessary logs instead of outputting all logs. As a result, increase of the traffic of the network NW1 and adverse influence (e.g., processing delay) of output of an enormous amount of logs on the fundamental function can be suppressed.

The IPS (intrusion prevention system) 3 is a network apparatus for monitoring and analyzing data sent from devices (e.g., PC1 and IoT devices 2-1 to 2-*n*) connected to the network NW1. The IPS 3 can detect an illegal access or an attack or its sign from a third party through data analysis. When detecting such, the IPS 3 informs a system manager of it. The IPS 3 can also defend against an illegal access or an attack from a third party. It is noted that the IPS 3 is connected to the SIEM 4 so as to enable direct communication of data or information between them. It is conceivable to connect an IDS (intrusion detection system), a firewall, a proxy server, or the like in place of the IPS 3.

The SIEM (security information and event management) 4 collects and analyzes plural pieces of data or information received via the IPS 3 or the network NW1 (e.g., logs sent from the PC 1 or the IoT devices 2-1 to 2-*n*). The SIEM 4 is an apparatus having a high-level information processing ability capable of detecting whether the PC 1 or the IoT devices 2-1 to 2-*n* are exposed to a danger or a related threat (e.g., whether the PC 1 or the IoT devices 2-1 to 2-*n* are receiving or are about to receive a cyber attack from a third party) by analyzing logs. For example, the SIEM 4 is configured using a PC or a server having a higher level information processing ability than a PC does. When detecting that the PC 1 or the IoT devices 2-1 to 2-*n* are exposed to a danger or a related threat as a result of analysis of logs, the SIEM 4 can notify the system manager of it.

The SOC (security operation center) 5 is an organization for detecting and analyzing a cyber attack on the basis of analysis results of the IPS 3 or the SIEM 4. The SOC 5 consists of network apparatus that are plural computers for monitoring analysis results and is managed by, for example, persons having expertise in system management and security.

Figure 2:
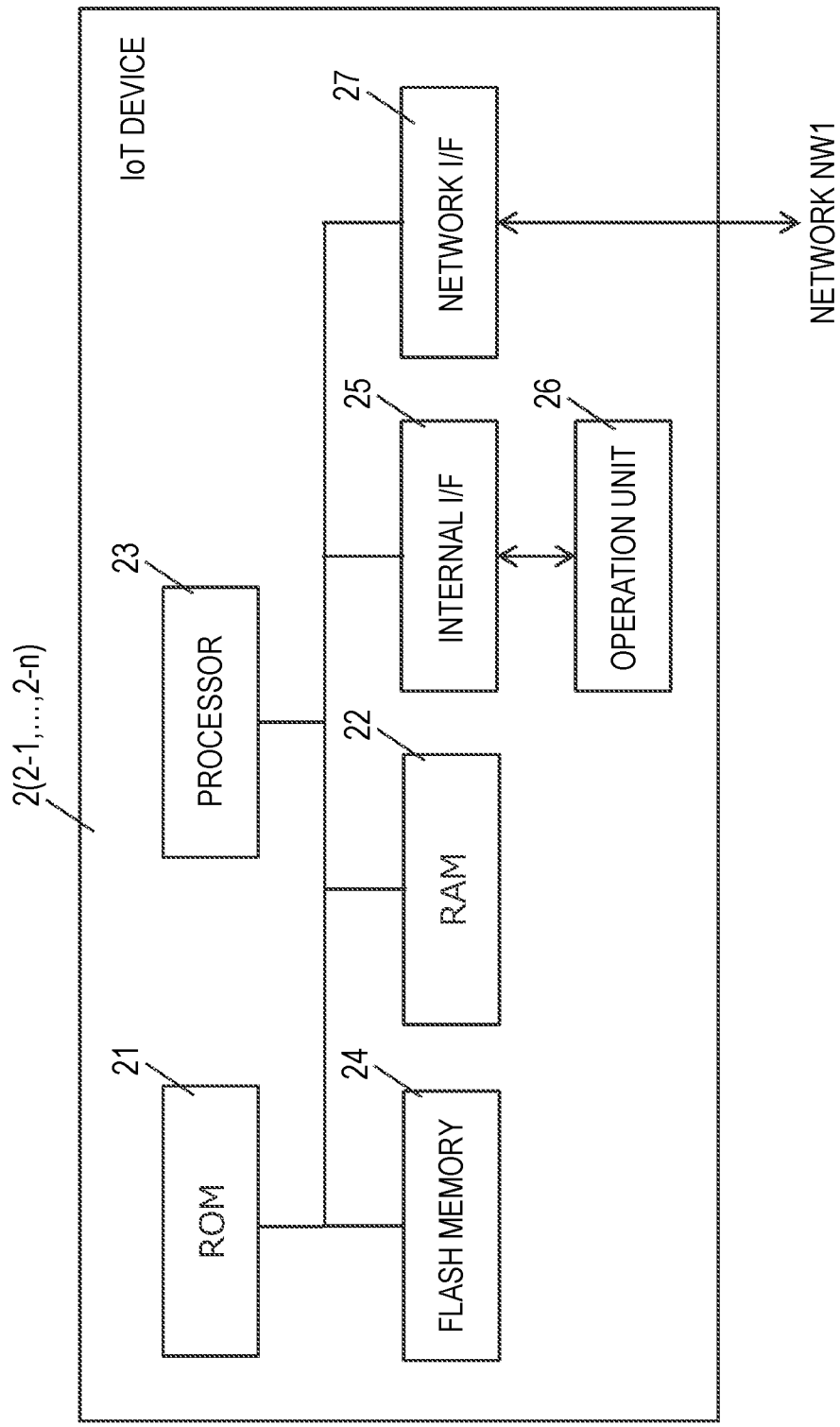
FIG. 2 is a block diagram showing an example internal configuration of each of IoT devices.

FIG. 2 is a block diagram showing an example internal configuration of each of the IoT devices 2-1 to 2-*n*. The IoT devices 2-1 to 2-*n* may have a common internal configuration, and in the following description each of them will be referred to generically as an "IoT device 2" unless there is any particular reason. The IoT device 2 is configured so as to include a ROM 21, a RAM 22, a processor 23, a flash memory 24, an internal I/F 25, an operation unit 26, and a network I/F 27.

The ROM 21 is stored in advance with programs and data for controlling the processor 23.

The RAM 22 is a work memory to be used during operation of the processor 23. The RAM 22 temporarily stores programs and data that are necessary for operation of the processor 23 and information, data, etc. generated during operation of the processor 23.

The processor 23 is configured using, for example, a CPU (central processing unit) or an MPU (microprocessing unit) that is lower in processing ability than the processor (not shown) of the PC1, and controls operation of each unit of the IoT device 2. The processor 23, which functions as a control unit of the IoT device 2, performs control processing for controlling operations of the individual units of the IoT device 2 in a centralized manner, data input/output processing with each unit of the IoT device 2, data computation (calculation) processing, and data storage processing. The processor 23 operates according to the programs and data stored in the ROM 21. As an example of a "generation unit," the processor 23 generates a log indicating execution history information of processing (e.g., processing performed according to the programs and data stored in the ROM 21). Furthermore, as an example of a "registration unit," the processor 23 generates comparison information consisting of contents of respective items of each of logs that were output in the past on the basis of the contents of the logs, and registers the generated comparison information in the flash memory 24 as a dynamic list L3.

As an example of a "selection unit," the processor 23 decides to output a generated log if the generated log includes information (static information, that is, invariable information) contained in a black list L1. The processor 23 decides not to output a generated log if the generated log includes information (static information, that is, invariable information) contained in a white list L2. Furthermore, the processor 23 determines the necessity of output of a generated log on the basis of the contents of the log and the contents of a dynamic list L3. The details of an example operation of the processor 23 will be described later in detail (see FIGS. 5B and 6).

As an example of a "memory," the flash memory 24 stores and stores lists to be used for determining whether to output, to the outside (e.g., to the SIEM 4 which is connected via the network NW1), a log generated by the processor 23 or the operation unit 26. The lists are the black list L1, the white list L2, and the dynamic list L3. At least one of the black list L1, the white list L2, and the dynamic list L3 may be stored temporarily in the RAM 22.

The black list L1 which is an example of a "first list" includes information (an example of first static information) indicating that execution history information (i.e., log) of processing that was performed by the processor 23 or the operation unit 26 indicates occurrence of an abnormality.

The white list L2 which is an example of a "second list" includes information (an example of second static information) indicating that execution history information (i.e., log) of processing that was performed by the processor 23 or the operation unit 26 indicates that it was performed in a normal manner.

The dynamic list L3 which is an example of a "third list" includes dynamic information to be used for determining the necessity of output of log execution history information (e.g., log) of processing executed by the processor 23 or the operation unit 26 according to its contents. The details of a specific example of the dynamic list L3 will be described later.

The internal I/F 25 is an interface for performing input/output of data or information between the operation unit 26 and the other units.

For example, the operation unit 26 may be either a sensing device for detecting a prescribed event or a parameter such as a temperature, pressure, or humidity or a shooting device for shooting a subject existing in a preset or variable angle of view. The operation unit 26 is not limited to such a sensing device or shooting device. After performing sensing or shooting processing, the operation unit 26 may generate a log indicating execution history information of the processing and pass it to the processor 23.

The network I/F 27 has a role of a communication unit of the IoT device 2. When the processor 23 has decided to output a log, the network I/F 27 transmits a log generated by the processor 23 or the operation unit 26 to the outside (e.g., to the SIEM 4 connected to the IoT device 2 over the network NW1).

Figure 3A:
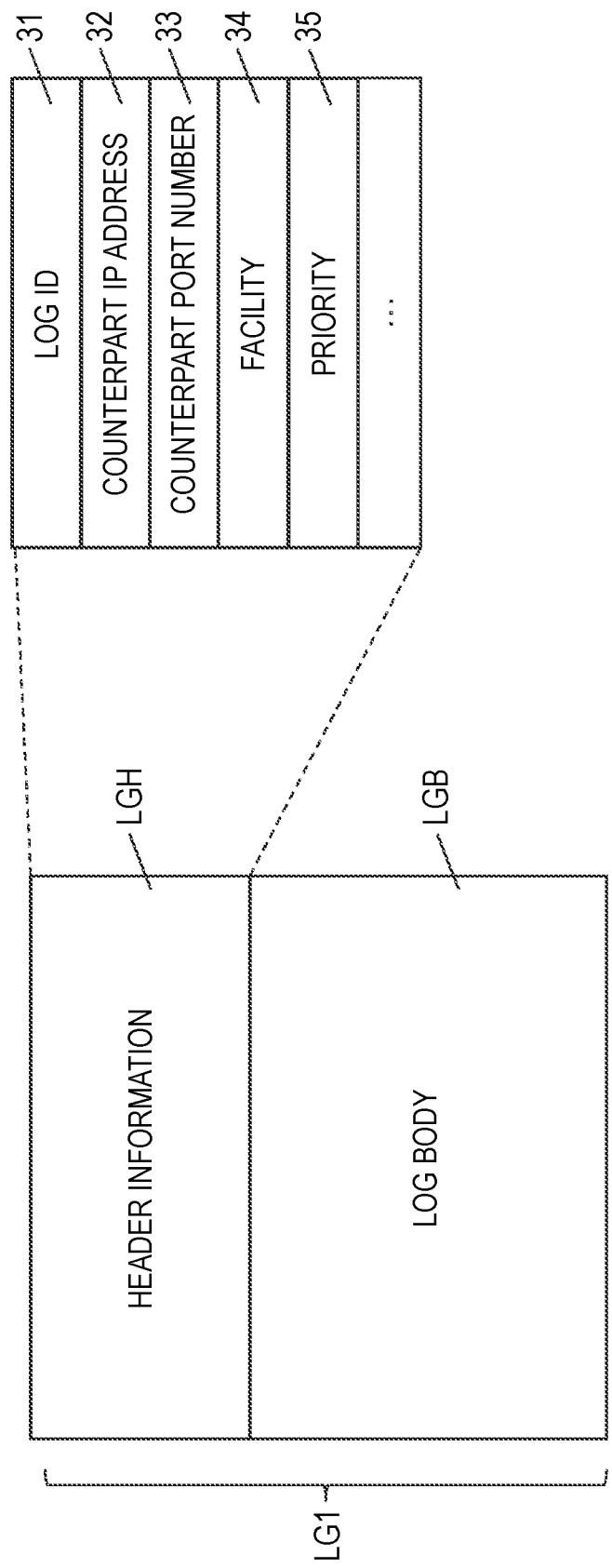
FIG. 3A is a diagram showing an example configuration of a log.
Figure 3B:
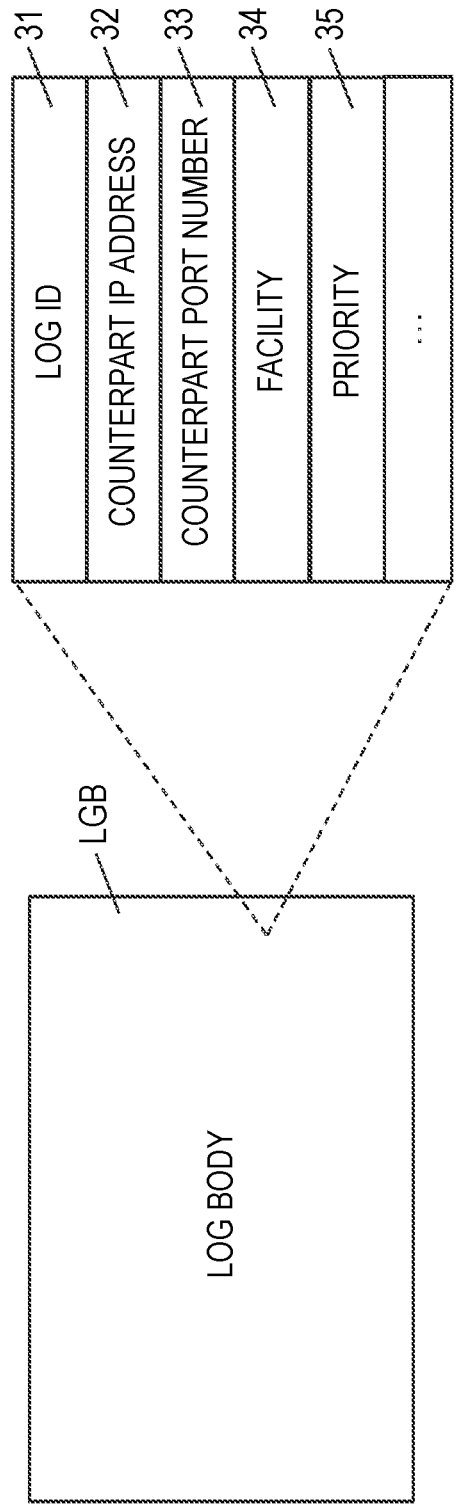
FIG. 3B is a diagram showing another example configuration of a log.

FIGS. 3A and 3B are diagrams showing example structures of a log. A log LG1 shown in FIG. 3A includes header information LGH and a log body LGB. There exist a case that various kinds of information that are used for judging whether the IoT device 2 employed in the first embodiment needs to output (e.g., transmit to the SIEM 4) the log LG1 are written in the header information LGH (see FIG. 3A) and a case that they are written in the log body LGB (see FIG. 3B). For example, the above-mentioned various kinds of information are a log ID 31, a counterpart IP (Internet Protocol) address 32, a counterpart port number 33, a facility 34, priority 35, and other information.

The log ID 31 is information to be used for identifying the log. The details of the log ID 31 will be described later with reference to FIGS. 4A and 4B. The counterpart IP address 32 indicates an IP address of a communication device that is a communication counterpart of the IoT device 2. The counterpart port number 33 indicates a number of a port to be used by a communication between the IoT device 2 and the communication counterpart. The facility 34 is information to be used for log type classification. The priority 35 is information indicating urgency (e.g., warning level or serious danger level) of the log.

Figure 4A:
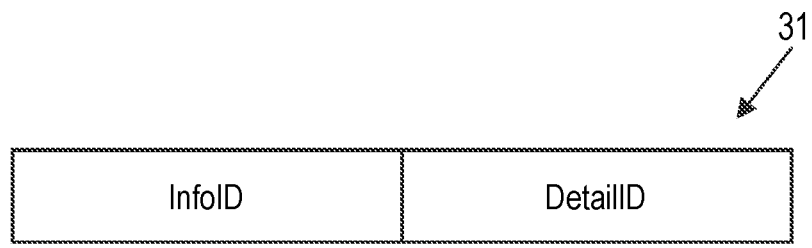
FIG. 4A is a diagram showing an example structure of a log ID.

FIG. 4A is a diagram showing an example structure of the log ID 31. FIG. 4B is a table showing example types of a log LG1. As shown in FIG. 4A, the log ID 31 has a structure that "InfoID" and "DetailID" are set adjacent to each other.

"InfoID" indicates a type of the log LG1. "DetailID" is an ID that is assigned to detailed contents of the log LG1.

FIG. 4B exemplifies, as log types, a normal-type log, an abnormal-type log, an iptables log, an Apache (registered trademark) log, and a Secure log. In the normal-type log, InfoID is "1" (hexadecimal) and DetailID is from "8001" to "81ff" (hexadecimal), for example. In the abnormal-type log, InfoID is "2" (hexadecimal) and DetailID is from "8001" to "81ff" (hexadecimal), for example. In the iptables log, InfoID is "5" (hexadecimal) and DetailID is "1" (hexadecimal), for example. In the Apache (registered trademark) access log, InfoID is "7" (hexadecimal) and DetailID is "1" (hexadecimal), for example. In the Secure log, InfoID is "8" (hexadecimal) and DetailID is "1" (hexadecimal), for example. In this manner, different log IDs 31 each consisting of InfoID and DetailID are formed for the respective log types so as to be discriminated from each other.

Figure 5B:
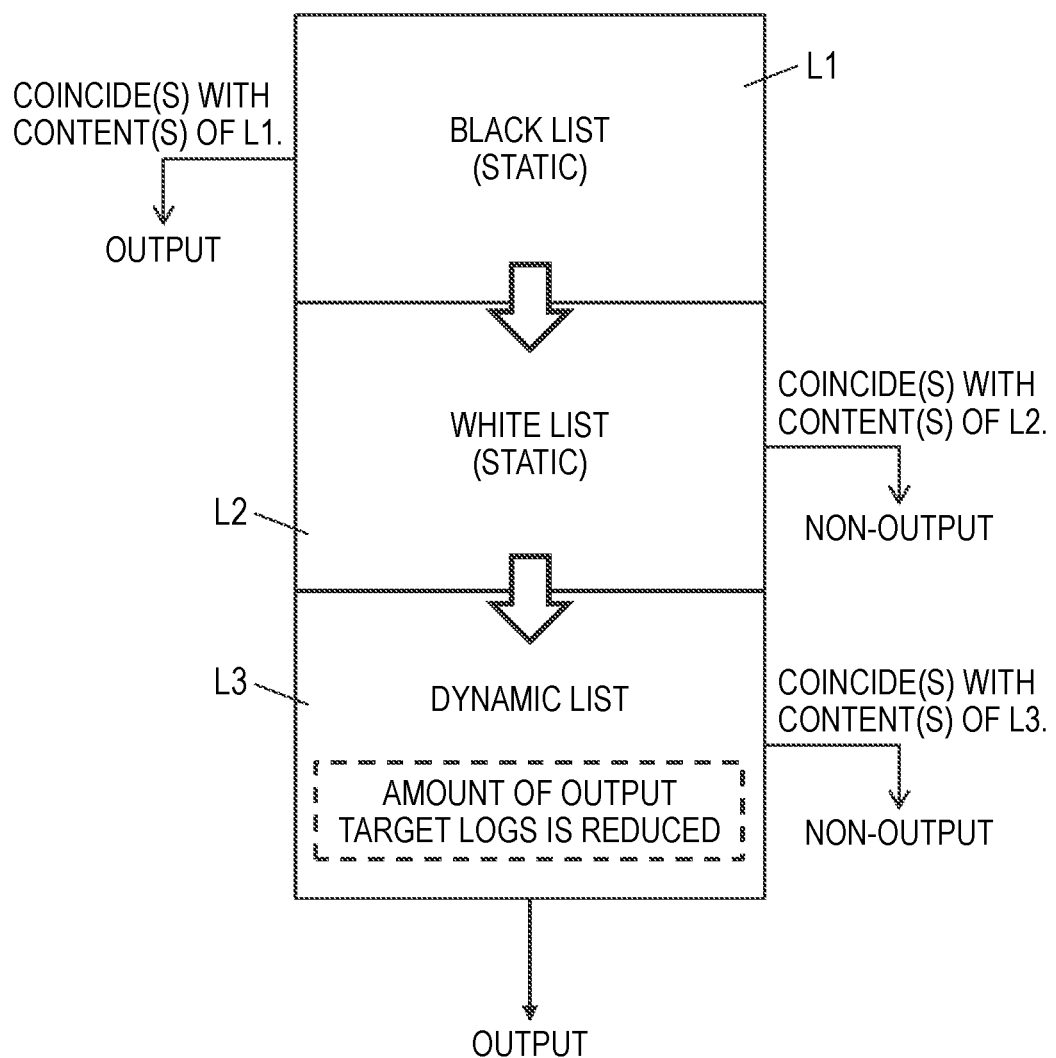
FIG. 5B is a diagram illustrating an outline of an example of how the IoT device employed in the first embodiment operates.
Figure 6:
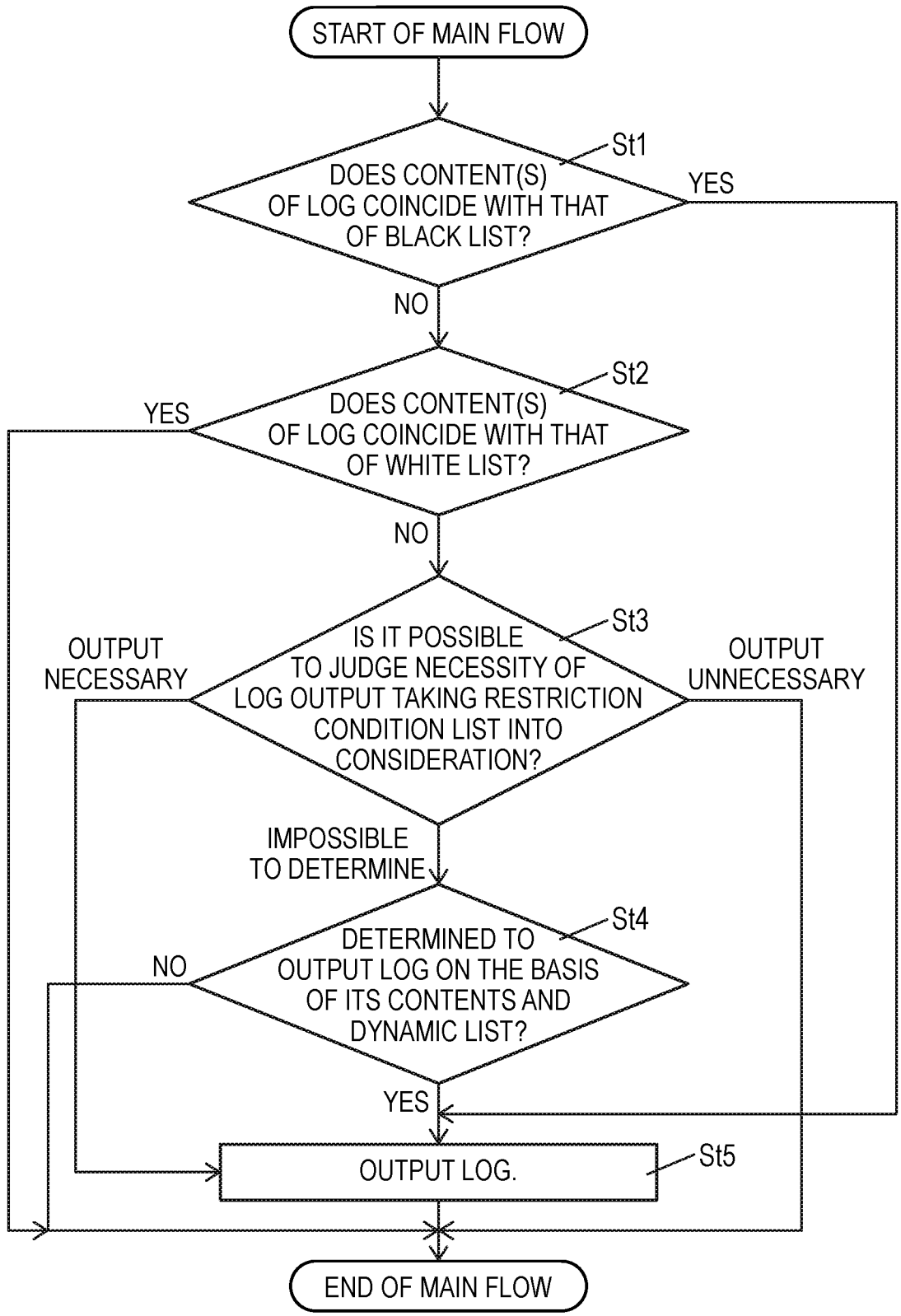
FIG. 6 is a flowchart showing, in times-series order, how the IoT device employed in the first embodiment operates.

Next, an outline of an example operation for determining the necessity of output of a log in the IoT device 2 employed in the first embodiment will be described with reference to FIGS. 5A, 5B, and 6. FIG. 5A is a table showing sets of example items that constitute the black list, the white list, and the dynamic list, respectively. FIG. 5B is a diagram illustrating an outline of an example of how the IoT device 2 employed in the first embodiment operates. FIG. 6 is a flowchart showing, in times-series order, how the IoT device 2 employed in the first embodiment operates.

As shown in FIG. 5A, the black list L1 employed in the first embodiment includes, as a comparison item, a content indicating that a processing execution result is abnormal for each of the log ID, the counterpart IP address and port number, the facility, the priority, a log message, and an Apache (registered trademark) status.

The white list L2 employed in the first embodiment includes, as a comparison item, a content indicating that a processing execution result is normal for each of the log ID, the counterpart IP address and port number, the facility, the priority, and the Apache (registered trademark) status.

The dynamic list L3 employed in the first embodiment includes one or more pieces of comparison information (see FIG. 7) each of which includes, as comparison items, a counterpart IP address, a port number, and a log ID (extracted pieces of information) among contents written in a log that was output in the past.

As shown in FIGS. 5B and 6, every time a log (e.g., log LG1) indicating execution history information of processing is generated, the processor 23 of the IoT device 2 judges whether the contents written in the log include a content(s) that coincides with the content(s) of all or part of the comparison items in the black list L1 (Sa). If judging that the contents written in the generated log (the term "generated log" will be used below for convenience) include a content(s) that coincides with the content(s) of all or part of the comparison items in the black list L1 (St1: yes), the processor 23, which is an example of the "selection unit," decides to output the generated log. The processor 23 outputs (e.g., transmits to the SIEM 4) the generated log via the network I/F 27 (St5).

On the other hand, if judging that the contents written in the generated log include no content that coincides with any of the comparison items in the black list L1 (St1: no), then the processor 23 judges whether the contents written in the log include a content(s) that coincides with the content(s) of all or part of the comparison items in the white list L2 (St2). If judging that the contents written in the generated log include a content(s) that coincides with the content(s) of all or part of the comparison items in the white list L2 (St2:

yes), the processor 23 decides not to output the generated log (i.e., the generated log should not be output).

On the other hand, if judging that the contents written in the generated log include no content that coincides with any of the comparison items in the white list L2 (St2: no), then the processor 23 judges whether it is possible to judge the necessity of output of the generated log taking a restriction condition list L4 (described later; see FIG. 8A) into consideration (St3). If judging taking the restriction condition list L4 into consideration that the generated log should be output (St3: output necessary), the processor 23 decides to output the generated log. The processor 23 outputs (e.g., transmits to the SIEM 4) the generated log via the network I/F 27 (St5).

If judging taking the restriction condition list L4 into consideration that the generated log should not be output (St3: output unnecessary), the processor 23 decides not to output the generated log (i.e., the generated log should not be output).

Furthermore, if judging that it is impossible to judge the necessity of output of the generated log taking the restriction condition list L4 into consideration (St3: impossible to determine), then the processor 23 judges on the basis of the contents of the generated log and the dynamic list L3 whether output of the generated log is necessary (St4). If judging on the basis of the contents of the generated log and the dynamic list L3 that output of the generated log is necessary (St4: yes), the processor 23 decides to output the generated log. The processor 23 outputs (e.g., transmits to the SIEM 4) the generated log via the network I/F 27 (St5).

On the other hand, if judging on the basis of the contents of the generated log and the dynamic list L3 that output of the generated log is not necessary (St4: no), the processor 23 decides not to output the generated log (i.e., the generated log should not be output). Although the processor 23 makes comparison with the black list L1 and the white list L2 in this order to determine the necessity of output of the generated log, comparison may be made with the white list L2 and the black list L1 in this order. However, where comparison is made with the black list L1 and the white list L2 in this order as shown in FIG. 6, the processor 23 decides to output the generated log if the generated log includes the content(s) of all or part of the comparison items and hence the necessity of output of the generated log can be determined quickly.

Figure 7:
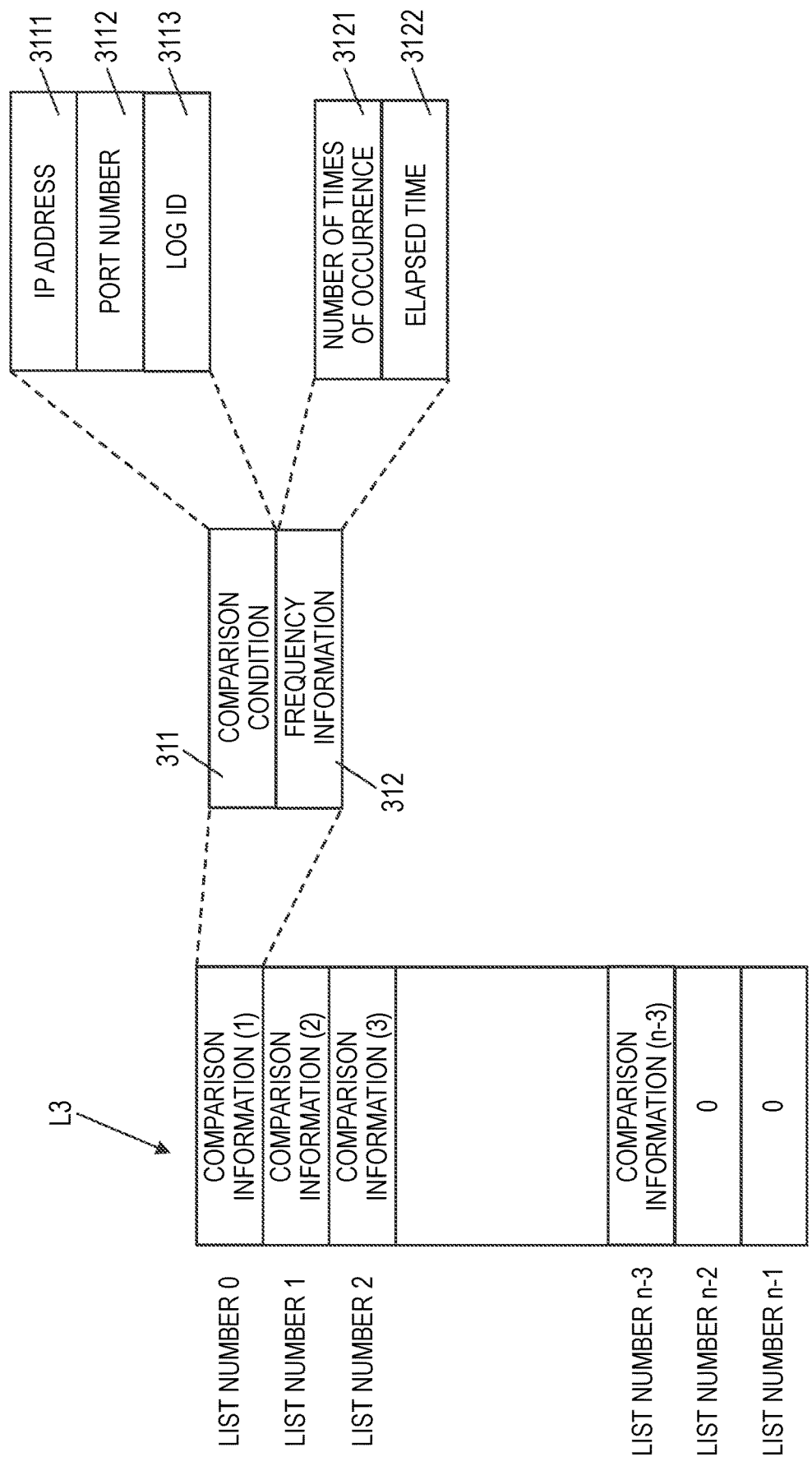
FIG. 7 is a diagram showing an example structure of the dynamic list.

Next, the details of the dynamic list L3 employed in the first embodiment will be described with reference to FIG. 7. FIG. 7 is a diagram showing an example structure of the dynamic list L3. The dynamic list L3 is a list in which a maximum of n pieces of comparison information (from list number "0" to list number "n−1") can be registered. In the example shown in FIG. 7, the dynamic list L3 has (n−3) pieces of comparison information, that is comparison information (1), comparison information (2), comparison information (3), . . . , comparison information (n−3). FIG. 7 shows that no comparison information has been registered at addresses of list number "n−2" and list number "n−1." Each piece of comparison information (e.g., comparison information (1)) consists of a comparison condition 311 and a frequency information 312.

The comparison condition 311 has an IP address 3111, a port number 3112, and a log ID 3113. The IP address 3111 is the counterpart IP address 32 shown in FIG. 3A and is a counterpart IP address that was contained in a log that is a source of generation of the comparison condition 311 (i.e., a log that was output in the past). The port number 3112 is the counterpart port number 33 shown in FIG. 3A and is a counterpart port number that was contained in the log that is the source of generation of the comparison condition 311 (i.e., a log that was output in the past). The log ID 3113 is the log ID 31 shown in FIG. 3A.

The frequency information 312 has a number of times of occurrence 3121 and an elapsed time 3122. The number of times of occurrence 3121 is the number of times logs including contents that coincide with the corresponding comparison condition 311 were generated (in other words, occurred). For example, when the number of times of occurrence 3121 is "0" (in other words, a log including contents that coincide with the corresponding comparison condition 311 is generated for the first time), the processor 23 decides to output the log. After that, the processor 23 increments the number of times of occurrence 3121 every time a log including contents that coincide with the corresponding comparison condition 311 is generated, and initializes (i.e., resets) the number of times of occurrence 3121 when it has reached a first preset value (e.g., "10"). As a result, the processor 23 decides to output a log only once, that is, when 10 logs including contents that coincide with the corresponding comparison condition 311 have been generated. Thus, an act of outputting generated logs having similar contents casually can be suppressed.

The elapsed time 3122 is an elapsed time from generation of a log including contents that coincide with the corresponding comparison condition 311. That is, the processor 23 stores, as the elapsed time 3122, an elapsed time from generation of a log including contents that coincide with the corresponding comparison condition 311. A time of generation of a log, itself, can be stored as the frequency information instead of the elapsed time 3122. The processor 23 initializes (i.e., resets) the number of times of occurrence 3121 and the elapsed time 3122 if the number of times of occurrence 3121 has not reached the first preset value (e.g., "10") in the period of a second preset value (e.g., 10 minutes). This makes it possible to avoid outputting logs having similar contents if at least the period of the second preset value has not elapsed from generation of a log including contents that coincide with the corresponding comparison condition 311, whereby the log output amount can be reduced to a proper value.

Figure 8A:
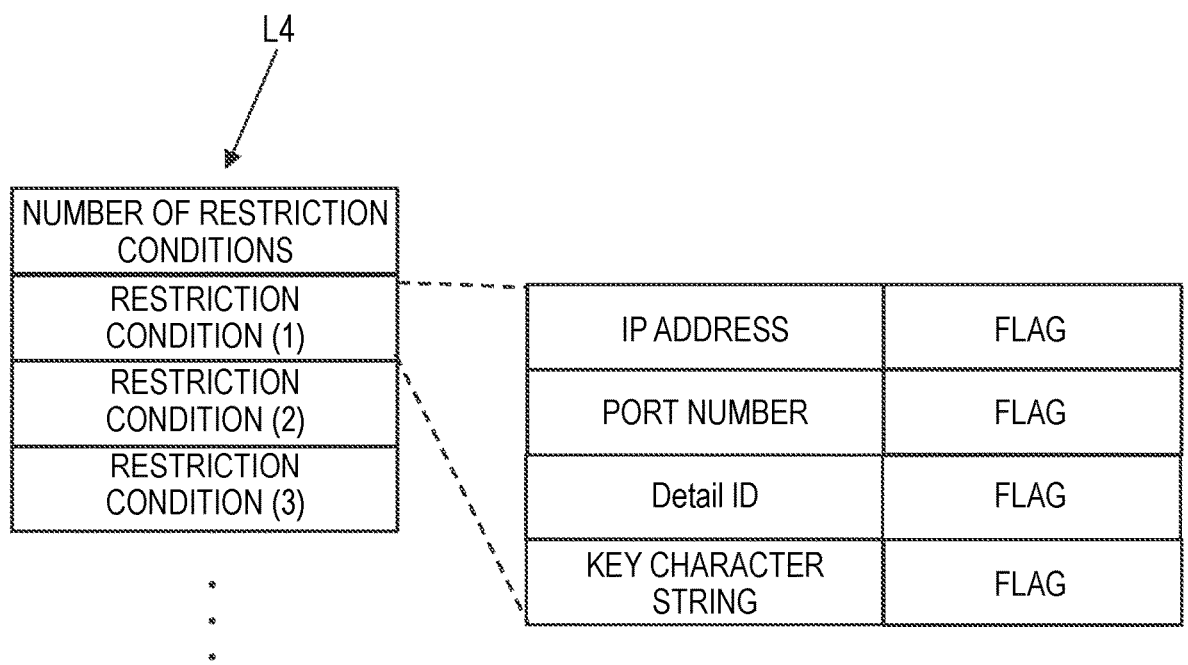
FIG. 8A is a diagram showing an example structure of a restriction condition list.
Figure 8B:
FIG. 8B is a drawing showing an example key character string written in a message of a log.
Figure 9A:
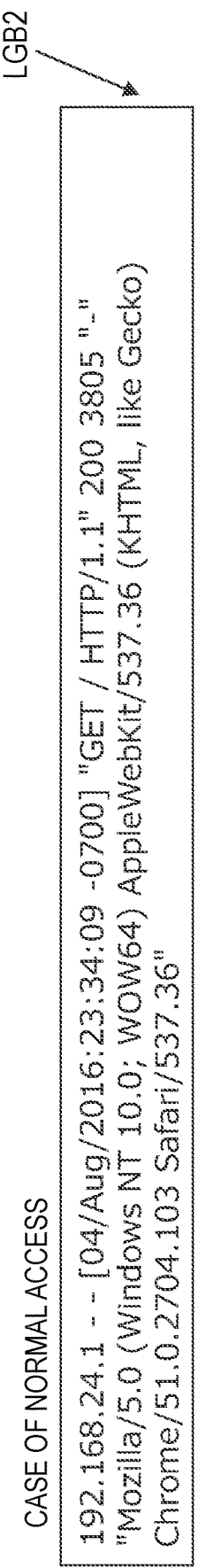
FIG. 9A is a drawing showing an example of a log generated when access is made to a web server normally.
Figure 9C:
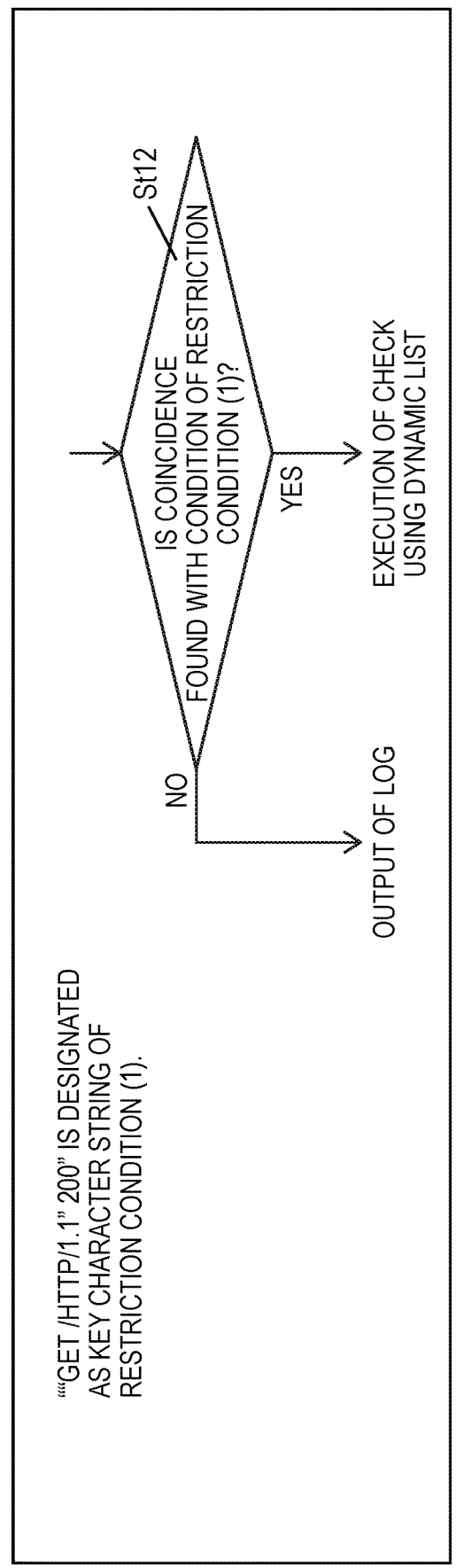
FIG. 9C is a simplified flowchart showing an example judgment procedure using conditions of a restriction condition (1).
Figure 10B:
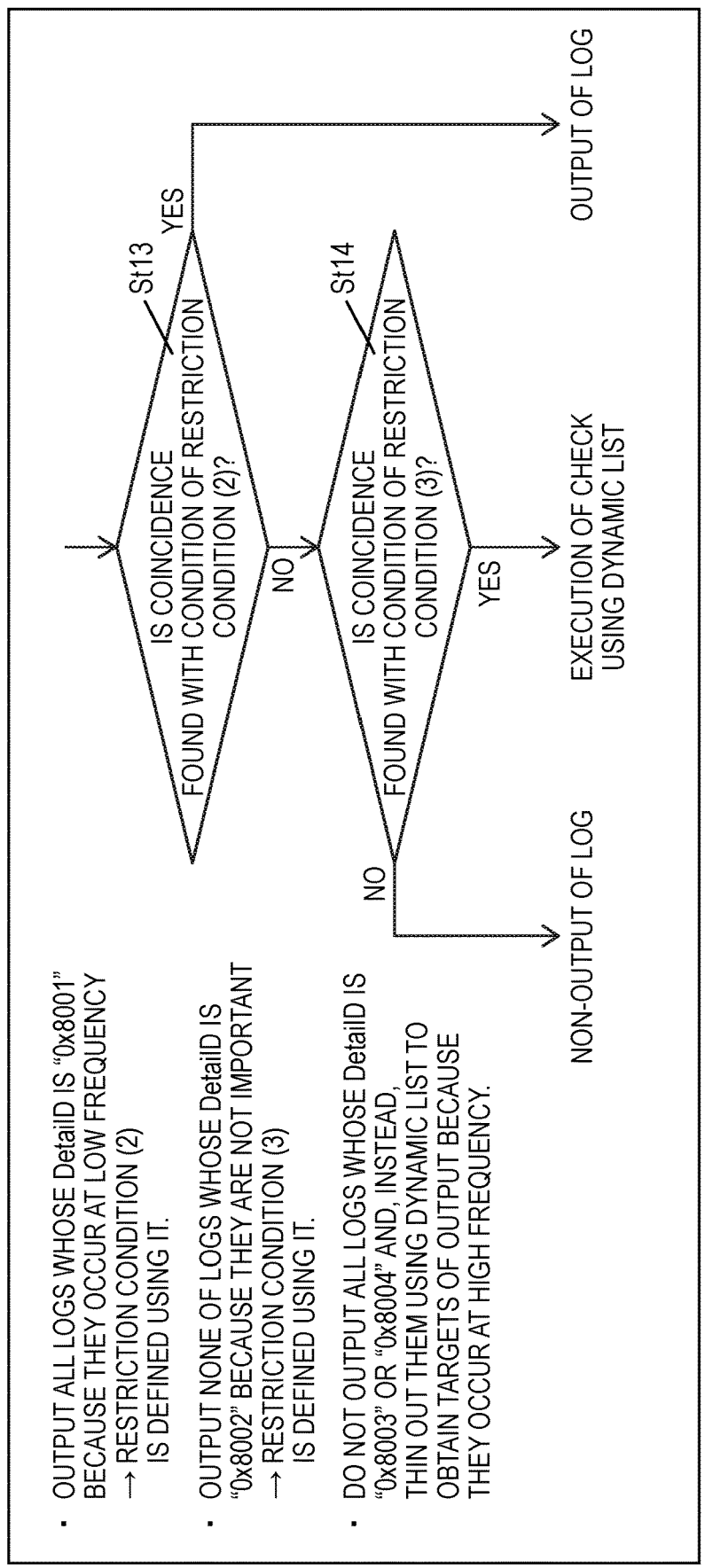
FIG. 10B is a simplified flowchart showing an example judgment procedure using conditions of a restriction condition (2) and conditions of a restriction condition (3).

Next, the details of a restriction condition list L4 employed in the first embodiment will be described with reference to FIGS. 8A, 8B, 9A, 9B, 9C, 10A, and 10B. FIG. 8A is a diagram showing an example structure of the restriction condition list L4. FIG. 8B is a drawing showing an example key character string written in a message of a log LGB1. FIG. 9A is a drawing showing an example of a log LGB2 generated when access is made to a web server normally. FIG. 9B is a drawing showing an example of a log LGB3 generated when an erroneous access is made to a web server. FIG. 9C is a simplified flowchart showing an example judgment procedure using conditions of a restriction condition (1). FIG. 10A is a table showing example logs having respective DetailID's of the normal-type log. FIG. 10B is a simplified flowchart showing an example judgment procedure using conditions of a restriction condition (2) and conditions of a restriction condition (3).

As shown in FIG. 8A, the restriction condition list L4 is a list including plural restriction conditions to be used for judging the necessity of determining whether to output a generated log or not using the dynamic list L3. More specifically, the restriction condition list L4 has the number of restriction conditions and individual restriction conditions (e.g., restriction condition (1), restriction condition (2), restriction condition (3), . . . ). Each restriction condition (e.g., restriction condition (1)) consists of a set of an IP address and a corresponding flag, a set of a port number of a corresponding flag, a set of DetailID and a corresponding flag, and a set of a key character string and a corresponding flag. Each flag is additional information indicating whether the corresponding item (IP address, port number, DetailID, or key character string) is used or not used as a restriction condition.

Each restriction condition is provided for each kind of InfoID which is part of a log ID 31 (see FIG. 4A), for example, for each of the Apache (registered trademark) access log (InfoID is "7" (hexadecimal)), the normal-type log (InfoID is "1" (hexadecimal)), the abnormal-type log (InfoID is "2" (hexadecimal)), . . . .

The processor 23 extracts a restriction condition provided so as to correspond to the log ID 31 of a generated log from the restriction conditions constituting the restriction condition list L4 and compares it with the generated log. Using the log ID corresponding to the extracted restriction condition, the processor 23 judges that a generated log including a content that coincides with the restriction condition is not a target of generated log output/non-output determination using the dynamic list L3. This makes it possible to quickly judge whether to output a generated log or not without deciding to output or not to output the generated log using the dynamic list L3, depending on the kind of the generated log including a content that coincides with the restriction condition.

Furthermore, the processor 23 extracts a restriction condition provided so as to correspond to the log ID 31 of a generated log from the restriction conditions constituting the restriction condition list L4 and compares it with the generated log. Using the log ID corresponding to the extracted restriction condition, the processor 23 may judge that a generated log including a content that coincides with the restriction condition is a target of generated log output/non-output determination using the dynamic list L3. This makes it possible to make a detailed judgment using the dynamic list L3 without checking the necessity of output of the generated log (i.e., whether to output it or not) in a simplified manner using the restriction condition, depending on the kind of the generated log including contents that coincide with the restriction condition.

The IP address that is part of a restriction condition is a counterpart IP address 32 shown in FIG. 3A. The port number that is part of a restriction condition is a counterpart port number 33 shown in FIG. 3A. DetailID that is part of a restriction condition is DetailID shown in FIG. 4A. As shown in, for example, FIG. 8B, the key character string that is part of a restriction condition is a particular character string written in a log LGB1 (refer to the underlined portion in FIG. 8B).

FIG. 9A shows part of a log LGB2 of an example case that, for example, the IoT device 2 has accessed a Web server normally. InfoID of the log ID of this log LGB2 is "7" (hexadecimal) (see FIG. 4B). Since many logs like the log LGB2 are generated in a state that the IoT device 2 is in an ordinary state, a character string ""GET/HTTP/1.1" 200" is registered in advance as a key character string of the restriction condition (1), for example. Thus, as shown in FIG. 9C, if a log is generated that includes a content that coincides with the key character string (refer to the above statement) of the restriction condition (1), since this log includes the content that coincides with the restriction condition (1) (St12: yes), the processor 23 judges that whether to output the log LGB2 or not should be decided using the dynamic list L3.

On the other hand, FIG. 9B shows part of a log LGB3 of an example case that an error has occurred when the IoT device 2 accesses a Web server. InfoID of the log ID of this log LGB3 is "7" (hexadecimal) (see FIG. 4B). Thus, as shown in FIG. 9C, if such a log LGB3 is generated, since the log LGB3 does not include the content that coincides with the restriction condition (1) (St12: no), the processor 23 judges that the log LGB3 should be output.

FIG. 10A shows a corresponding relationship between log message examples corresponding to four respective DetailID's of the normal-type log and events to occur in a case that the log type is the normal-type log (e.g., InfoID is "1" (hexadecimal); see FIG. 4B). For example, a log whose DetailID is "8001" (hexadecimal) is a log that occurs at the time of connection to the network. A log whose DetailID is "8002" (hexadecimal) is a log that occurs at the time of disconnection from the network. A log whose DetailID is "8003" (hexadecimal) is a log that occurs at the time of data reception. A log whose DetailID is "8004" (hexadecimal) is a log that occurs at the time of data transmission. Where in this manner plural detailed logs are defined in a layered manner in a single normal-type log, DetailID is used and registered in advance as a restriction condition.

More specifically, since logs whose DataiID is "8001" (hexadecimal) occur at a low frequency, all of them are made targets of output and DataiID "8001" is registered in advance as the restriction condition (2) (see FIG. 10B). Thus, if a log including a content that coincides with the restriction condition (2) (St13: yes), the processor 23 decides to output the log.

Since logs whose DataiID is "8002" (hexadecimal) are not important, all of them are made targets of non-output and DataiID "8002" is registered in advance as the restriction condition (3). Thus, if a log not including a content that coincides with the restriction condition (2) (St13: no), then the processor 23 judges whether the log includes a content that coincides with the restriction condition (3) (St14). If judging that the log includes a content that coincides with the restriction condition (3) (St14: yes), the processor 23 decides not to output it.

Since logs whose DataiID is "8003" (hexadecimal) or "8004" (hexadecimal) occur at a high frequency, it is not appropriate to make a output/non-output judgment on them in a simplified manner, that is, they are not suitable for setting of a restriction condition using DetailID Thus, the processor 23 judges that the log does not include a content that coincides with the restriction condition (3) (St14: no) and hence judges that an output/non-output determination should be made using the dynamic list L3.

Figure 11:
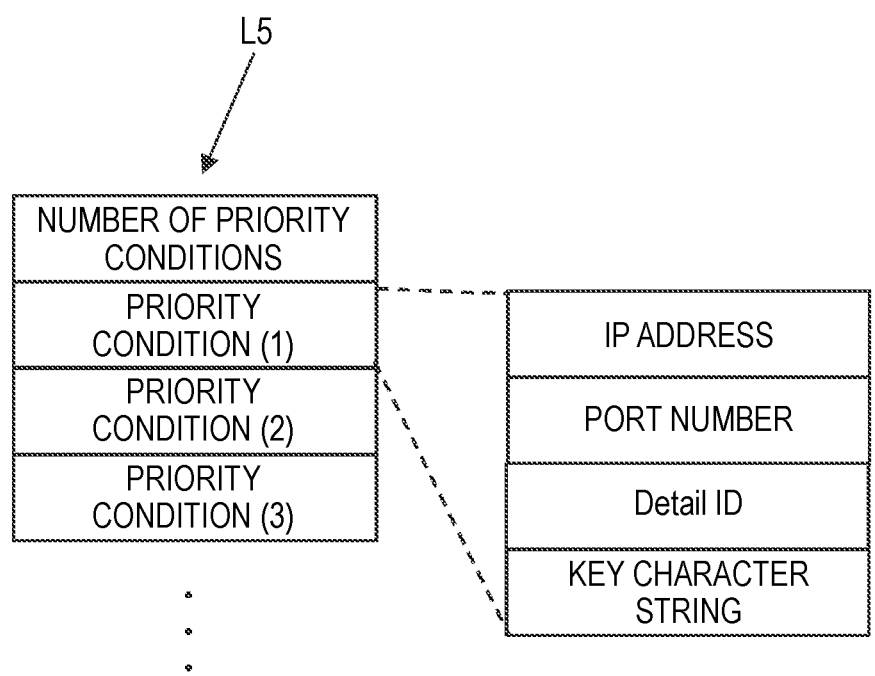
FIG. 11 is a diagram showing an example structure of a priority condition list for deleting comparison information or for not deleting comparison information.

Next, the details of a priority condition list L5 according to the first embodiment will be described with reference to FIG. 11. FIG. 11 is a diagram showing an example structure of the priority condition list L5 to be used for deleting comparison information or for not deleting comparison information. The priority condition list L5 is a list including plural priority conditions for preferentially deleting comparison information that is restricted in registration number or for not deleting comparison information. More specifically, the priority condition list L5 has the number of priority conditions and individual priority conditions (e.g., priority condition (1), priority condition (2), priority condition (3), . . . ). Each priority condition (e.g., priority condition (1)) consists of an IP address, a port number, DetailID, and a key character string.

As described above, the registration number of pieces of comparison information (see FIG. 7) constituting the dynamic list L3 is limited (e.g., to "n"; see FIG. 7) and (n+1)

or more pieces of comparison information cannot be registered. This is because the storage capacity of the flash memory 24 of the IoT device 2 which is of a low-end specification unlike the PC 1 is much smaller than that of the HDD of the PC1. Thus, the processor 23 which is an example of the "selection unit" deletes a piece(s) of comparison information of the dynamic list L3 if one or combinable two or more of a deletion condition 1 to a deletion condition 5 (described below) are satisfied, with an exception that the deletion condition 4 and the deletion condition 5 cannot be combined with each other because they are contradictory to each other.

Deletion condition 1: The processor 23 deletes the oldest one (in other words, the one registered first) of the pieces of comparison information.

Deletion condition 2: The processor 23 stores an occurrence frequency (e.g., the number of times of occurrence 3121 of frequency information 312) for each piece of comparison information and deletes comparison information having a lowest occurrence frequency.

Deletion condition 3: The processor 23 stores a registration time (i.e., a time of registration in the dynamic list L3) of each comparison information and updates the registration time if a log including a content that coincides with the comparison condition of the comparison information is generated. The processor 23 deletes comparison information in order of oldness of the registration time.

Deletion condition 4: The processor 23 registers the priority condition list L5 shown in FIG. 11 in the flash memory 24 and preferentially deletes comparison information having a comparison condition that coincides with one of the priority condition (1), the priority condition (2), priority condition (3), . . . that constitute the priority condition list L5. Where the deletion condition 4 is used, each of the priority condition (1), the priority condition (2), priority condition (3), . . . that constitute the priority condition list L5 can be regarded as a condition for deleting comparison information.

Deletion condition 5: The processor 23 registers the priority condition list L5 shown in FIG. 11 in the flash memory 24 and preferentially deletes comparison information having a comparison condition that does not coincide with one of the priority condition (1), the priority condition (2), priority condition (3), . . . that constitute the priority condition list L5. Where the deletion condition 5 is used, each of the priority condition (1), the priority condition (2), priority condition (3), . . . that constitute the priority condition list L5 can be regarded as a condition for not deleting comparison information.

Figure 12:
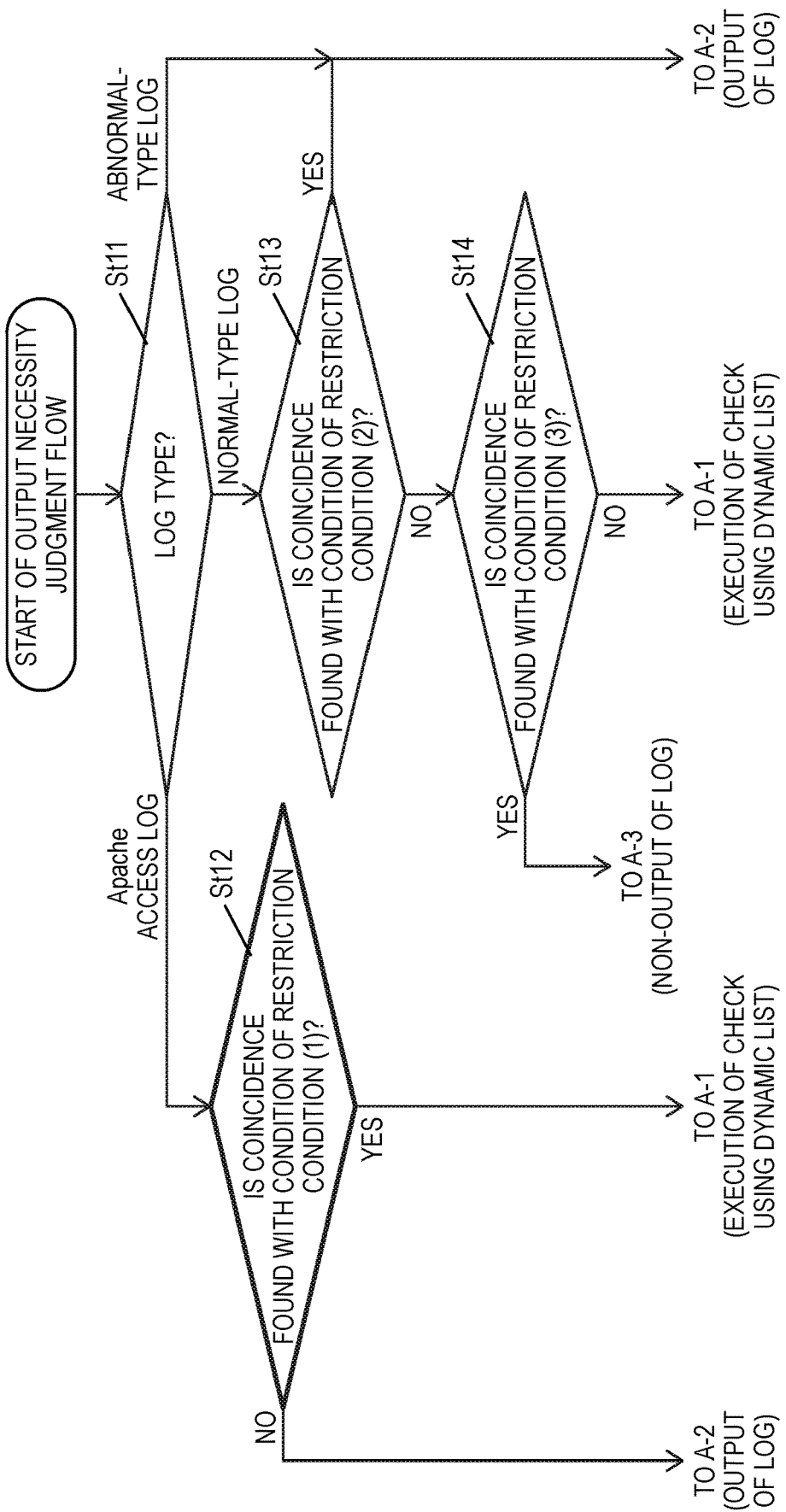
FIG. 12 is a flowchart of a detailed version of the operation procedure of step St3 in FIG. 6.
Figure 13:
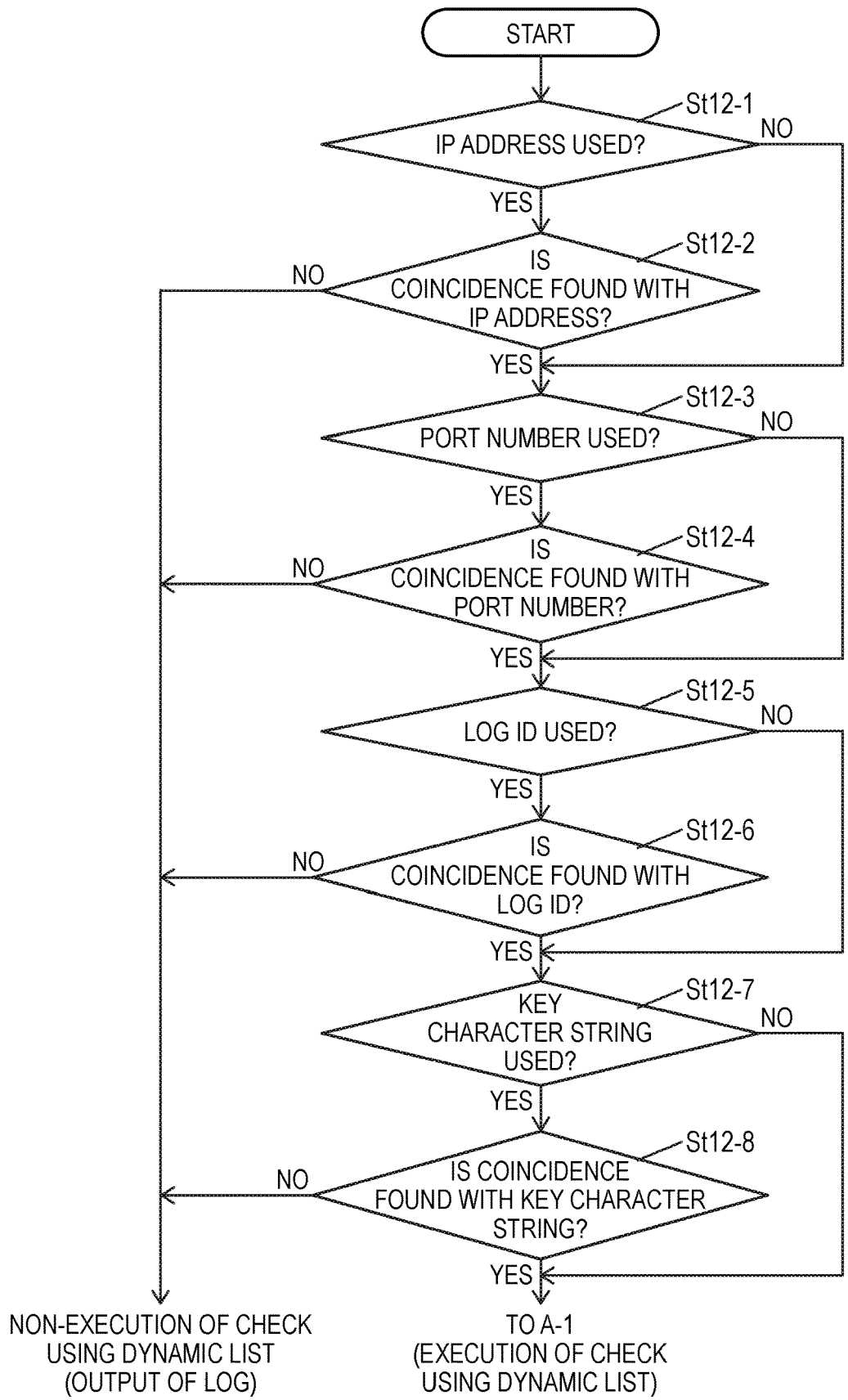
FIG. 13 is a flowchart of a detailed version of the operation procedure of step St12 in FIG. 12.
Figure 14:
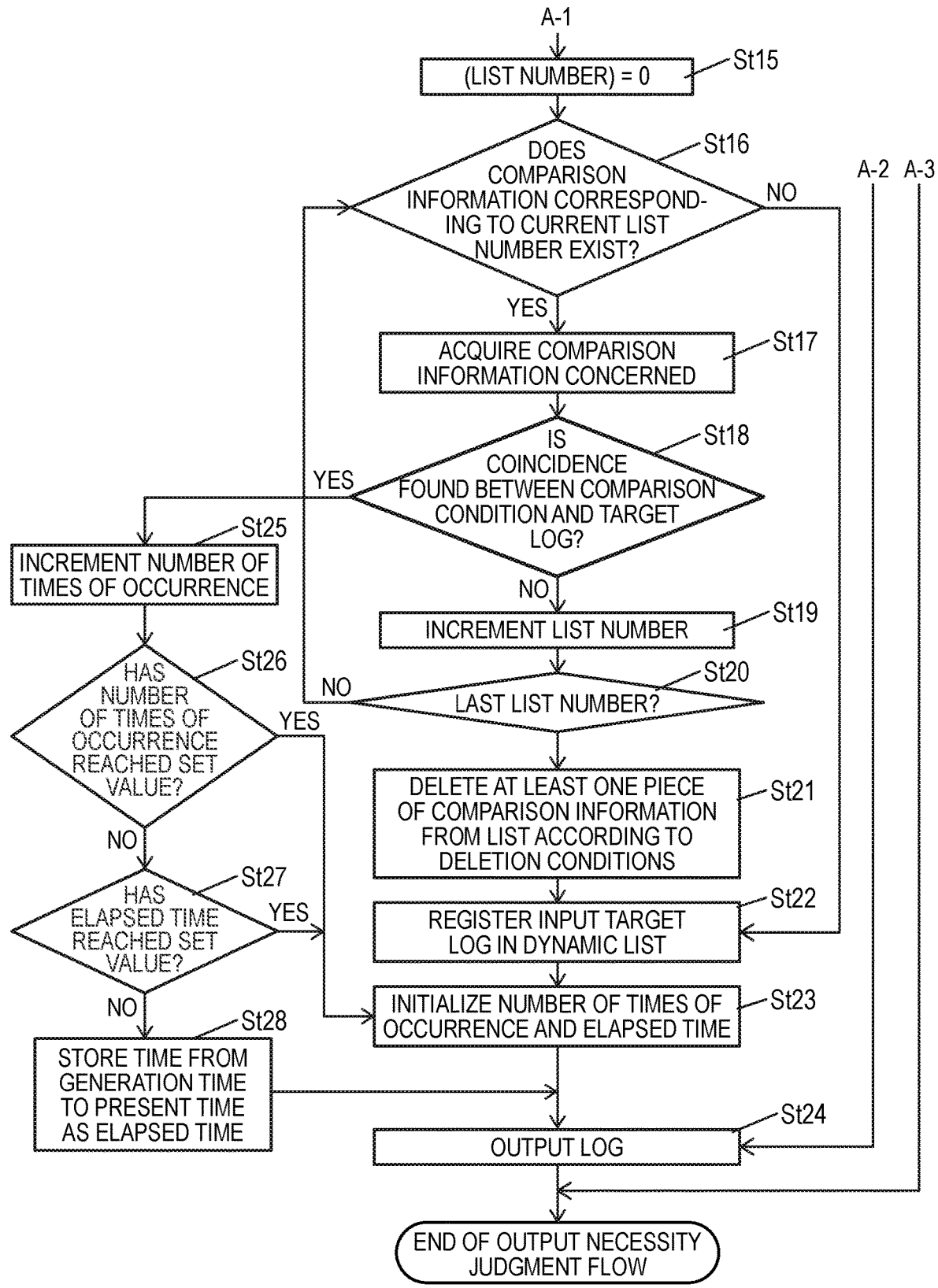
FIG. 14 is a flowchart of a detailed version of the operation procedure of step St4 in FIG. 6.
Figure 15:
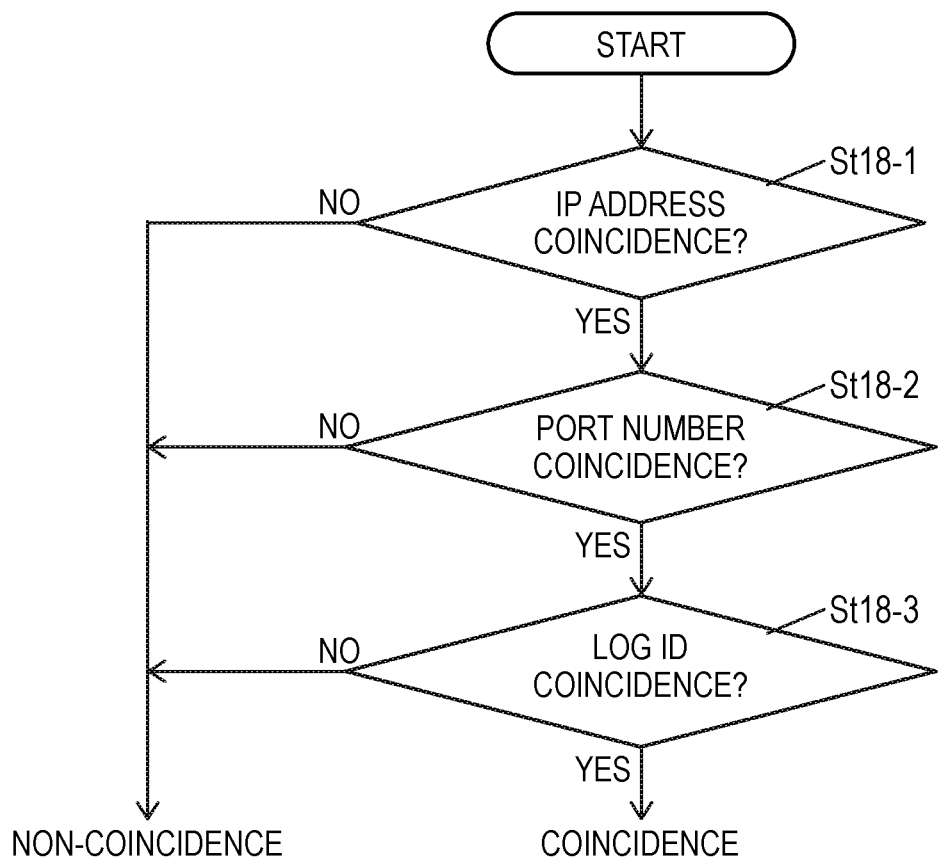
FIG. 15 is a flowchart of a detailed version of the operation procedure of step St18 in FIG. 14.

Next, the details of an operation procedure to be followed in judging output/non-output of a log generated using the restriction condition list L4 and the dynamic list L3 in the IoT device 2 employed in the first embodiment will be described with reference to FIGS. 12, 13, 14, and 15. FIG. 12 is a flowchart of a detailed version of the operation procedure of step St3 in FIG. 6. FIG. 13 is a flowchart of a detailed version of the operation procedure of step St12 in FIG. 12. FIG. 14 is a flowchart of a detailed version of the operation procedure of step St4 in FIG. 6. FIG. 15 is a flowchart of a detailed version of the operation procedure of step St18 in FIG. 14. The steps shown in FIGS. 12-15 are executed by, for example, the processor 23 of the IoT device 2.

Referring to FIG. 12, the processor 23 judges which of an Apache (registered trademark) access log, a normal-type log, or an abnormal-type log a log generated by the processor 23 or the operation unit 26 is on the basis of its InfoID (Sal).

If judging that the generated log is an Apache (registered trademark) access log (i.e., a log relating to access to a web server) (St11: Apache (registered trademark) access log), then the processor 23 judges whether the generated log coincides with the restriction condition (1) (St12).

If judging that the generated log includes a content that coincides with the restriction condition (1) (St12: yes), then the processor 23 judges that a process (A-1) (i.e., an output necessity check using the dynamic list L3) should be executed (St3 (FIG. 6): impossible to determine; see FIG. 9C).

On the other hand, if judging that the generated log does not include a content that coincides with the restriction condition (1) (St12: no), then the processor 23 judges that a process (A-2) (i.e., output of the generated log) should be executed (St3 (FIG. 6): output necessary; see FIG. 9C). That is, the processor 23 outputs the generated log (e.g., transmits it to the SIEM 4) (St24).

If judging that the generated log is an abnormal-type log (St11: abnormal-type log), then the processor 23 judges that the process (A-2) (i.e., output of the generated log) should be executed (St3 (FIG. 6): output necessary; see FIG. 10B). That is, the processor 23 outputs the generated log (e.g., transmits it to the SIEM 4) (St24).

If judging that the generated log is a normal-type log (Sal: normal-type log), then the processor 23 judges whether the generated log coincides with the restriction condition (2) (St13). If judging that the generated log includes a content that coincides with the restriction condition (2) (St13: yes), then the processor 23 judges that the process (A-2) (i.e., output of the generated log) should be executed (St3 (FIG. 6): output necessary; see FIG. 10B). That is, the processor 23 outputs the generated log (e.g., transmits it to the SIEM 4) (St24).

On the other hand, if judging that the generated log does not include a content that coincides with the restriction condition (2) (St13: no), then the processor 23 judges whether the generated log coincides with the restriction condition (3) (St14).

If judging that the generated log includes a content that coincides with the restriction condition (3) (St14: yes), then the processor judges that a process (A-3) (i.e., non-output of the generated log) should be executed (St3 (FIG. 6): output unnecessary; see FIG. 10B).

On the other hand, if judging that the generated log does not contain a content that coincides with the restriction condition (3) (St14: no), then the processor 23 judges that the process (A-1) (i.e., an output necessity check using the dynamic list L3) should be executed (St3 (FIG. 6): impossible to determine; see FIG. 10B).

Although in the first embodiment the Apache (registered trademark) access log, the normal-type log, and the abnormal-type log were used, it is also possible to set respective restriction conditions for the iptables log and the Secure log.

Referring to FIG. 13, the processor 23 judges whether a flag to the effect that an IP address is used is held in the restriction condition (1) (St12-1). If judging that a flag to the effect that an IP address is used is not held in the restriction condition (1) (St12-1: no), the processor 23 moves to step S12-3.

If judging that a flag to the effect that an IP address is used is held in the restriction condition (1) (St12-1: yes), then the processor 23 judges whether the generated log being processed by step St12 includes a content that coincides with the IP address of the restriction condition (1) (St12-2). If judging that the generated log being processed by step St12 does not include a content that coincides with the IP address of the restriction condition (1) (St12-2: no), then the processor 23 judges that an output necessity check using the dynamic list L3 should not be performed and the process (A-2) (i.e., output of the generated log) should be executed. That is, the processor 23 outputs the generated log (e.g., transmits it to the SIEM 4) (S24).

If judging that the generated log being processed by step St12 includes a content that coincides with the IP address of the restriction condition (1) (St12-2: yes), then the processor 23 judges whether the restriction condition (1) stores a flag to the effect that a port number is used (St12-3). If judging that the restriction condition (1) does not hold a flag to the effect that a port number is used (St12-2: no), the processor 23 moves to step S12-5.

If judging that the restriction condition (1) stores a flag to the effect that a port number is used (St12-3: yes), then the processor 23 judges whether the generated log being processed by step St12 includes a content that coincides with the port number of the restriction condition (1) (St12-4). If judging that the generated log being processed by step St12 does not include a content that coincides with the port number of the restriction condition (1) (St12-4: no), the processor 23 judges that an output necessity check using the dynamic list L3 should not be performed and the process (A-2) (i.e., output of the generated log) should be executed. That is, the processor 23 outputs the generated log (e.g., transmits it to the SIEM 4) (S24).

If judging that the generated log being processed by step St12 includes a content that coincides with the port number of the restriction condition (1) (St12-4: yes), then the processor 23 judges whether a flag to the effect that a log ID is used is held in the restriction condition (1) (St12-5). If judging that a flag to the effect that a log ID is used is not held in the restriction condition (1) (St12-5: no), the processor 23 moves to step S12-7.

If judging that a flag to the effect that a log ID is used is held in the restriction condition (1) (St12-5: yes), then the processor 23 judges whether the generated log being processed by step St12 includes a content that coincides with the log ID of the restriction condition (1) (St12-6). If judging that the generated log being processed by step St12 does not include a content that coincides with the log ID of the restriction condition (1) (St12-6: no), then the processor 23 judges that an output necessity check using the dynamic list L3 should not be performed and the process (A-2) (i.e., output of the generated log) should be executed.

If judging that the generated log being processed by step St12 includes a content that coincides with the log ID of the restriction condition (1) (St12-6: yes), then the processor 23 judges whether the restriction condition (1) stores a flag to the effect that a key character string is used (St12-7). If judging that the restriction condition (1) does not hold a flag to the effect that a key character string is used (St12-7: no), then the processor 23 judges that the process (A-1) (i.e., an output necessity check using the dynamic list L3) should be executed.

If judging that the restriction condition (1) stores a flag to the effect that a key character string is used (St12-7: yes), then the processor 23 judges whether the generated log being processed by step St12 includes a content that coincides with the key character string of the restriction condition (1) (St12-8). If judging that the generated log being processed by step St12 does not include a content that coincides with the key character string of the restriction condition (1) (St12-8: no), the processor 23 judges that an output necessity check using the dynamic list L3 should not be performed and the process (A-2) (i.e., output of the generated log) should be executed.

If judging that the generated log being processed by step St12 includes a content that coincides with the key character string of the restriction condition (1) (St12-8: yes), then the processor 23 judges that the process (A-1) (i.e., an output necessity check using the dynamic list L3) should be executed.

Referring to FIG. 14, in the process (A-1), the processor 23 sets the list number of the dynamic list L3 at "0" (St15) and judges whether comparison information corresponding to the current list number exists (e.g., not deleted) (St16). If judging that no comparison information corresponding to the current list number exists in the dynamic list L3 (St16: no), the processor 23 moves to step St22.

If judging that comparison information corresponding to the current list number exists in the dynamic list L3 (St16: yes), the processor 23 acquires that comparison information by reading it out from the flash memory 24 (St17). The processor 23 judges whether the read-out comparison information coincides with the target log (i.e., generated log), that is, the generated log includes a content that coincides with the comparison condition of the comparison information (St18).

If judging that coincidence is not found between the read-out comparison information and the target log (i.e., generated log) for which output necessity is to be determined using the dynamic list L3, the processor 23 increments the list number of the dynamic list L3 (St19). The processor 23 judges whether the incremented list number is the last list number (e.g., "n−1") (St20). If the incremented list number is not the last list number (St20: no), the processor 23 returns to step St16.

If judging that the incremented list number is the last list number (St20: yes), the processor 23 deletes at least one piece of comparison information from the dynamic list L3 according to the deletion conditions (refer to the above statement) (St21). The processor 23 generates comparison information (see FIG. 7) on the basis of the target log (e.g., generated log) for which output necessity is to be determined using the dynamic list L3 and registers it in the dynamic list L3 (St22). For example, the processor 23 generates comparison information by extracting an IP address 3111, a port number 3112, and a log ID 3113 from the generated log. The processor 23 initializes the number of times of occurrence and the elapsed time of the generated comparison information to 0 (St23). In this case, since the processor 23 judged that the generated log does not include a content that coincides with any of all the pieces of comparison information, the processor 23 judges that the generated log should be output and outputs the generated log according to that judgment (St24). At step S23, the processor 23 may store a generation time of the generated log instead of initializing the number of times of occurrence and the elapsed time of the generated comparison information.

On the other hand, when judging that the log for which output necessity is to be determined using the dynamic list L3 (i.e., generated log) coincides with the read-out comparison information (St18: yes), the processor 23 increments the number of times of occurrence (see FIG. 7) of the read-out comparison information (St25). The processor 23 judges whether the incremented number of times of occurrence has reached a set value (e.g., a first preset value such as "10") (St26). If judging that the incremented number of times of occurrence has reached the set value (e.g., the first preset value such as "10") (St26), the processor 23 initializes the number of times of occurrence and the elapsed time of the generated comparison information to 0 (St23).

On the other hand, if judging that the incremented number of times of occurrence has not reached the set value (e.g., the first preset value such as "10") (St26: no), then the processor 23 judges whether the elapsed time of the comparison information has reached a set value (e.g., a second preset value such as 10 minutes) (St27). If judging that the elapsed time of the comparison information has reached the set value (e.g., the second preset value such as 10 minutes) (St27: yes), the processor 23 initializes the number of times of occurrence and the elapsed time of the comparison information to "0" (St23).

If judging that the elapsed time of the comparison information has not reached the set value (e.g., the second preset value such as 10 minutes) (St27: no), the processor 23 stores (registers), as an elapsed time, a time from generation of the comparison information to the present time (St28). Step S28 may be omitted; that is, if judging that the elapsed time of the comparison information has not reached the set value (e.g., the second preset value such as 10 minutes) (St27: no), the processor 23 may move to step St24.

Referring to FIG. 15, the processor 23 judges whether the target log (i.e., generated log) coincides with the IP address of the comparison condition of the read-out comparison information (St18-1). If the IP address of the comparison condition does not coincide with the IP address written in the generated log (St18-1: no), the processor 23 makes a judgment "non-coincidence" as a judgment result of step S18.

On the other hand, if judging that the IP address written in the generated log coincides with the IP address of the comparison condition (St18-1: yes), then the processor 23 judges whether the target log (i.e., generated log) coincides with the port number of the comparison condition of the read-out comparison information (St18-2). If the port number of the comparison condition does not coincide with the port number written in the generated log (St18-2: no), the processor 23 makes a judgment "non-coincidence" as a judgment result of step S18.

On the other hand, if judging that the port number written in the generated log coincides with the port number of the comparison condition (St18-2: yes), then the processor 23 judges whether the target log (i.e., generated log) coincides with the log ID of the comparison condition of the read-out comparison information (St18-3). If the log ID of the comparison condition does not coincide with the log ID written in the generated log (St18-3: no), the processor 23 makes a judgment "non-coincidence" as a judgment result of step S18.

On the other hand, if judging that the log ID of the comparison condition coincides with the log ID written in the generated log (St18-3: yes), the processor 23 makes a judgment "coincidence" as a judgment result of step S18.

As described above, in the log output system 10 according to the first embodiment, the IoT device 2 generates a log indicating history information of execution of processing in the IoT device 2. The IoT device 2 stores, in the memory (e.g., flash memory 24, a first list (e.g., black list L1) including first static information indicating that the processing is abnormal, a second list (e.g., white list L2) including second static information indicating that the processing is normal, and a third list (e.g., dynamic list L3) including dynamic information to be used for determining the necessity of output of the log according to the log. The IoT device 2 decides to output the log generated by the generation unit if the log has the first static information, and decides not to output the log generated by the generation unit if the log has the second static information. Furthermore, the IoT device 2 determines the necessity of output of the log generated by the generation unit on the basis of the log and the third list (e.g., dynamic list L3).

Configured as described above, since logs to be reported to report to the SIEM 4 can be properly selected from the contents of the log generated as the processing history, the IoT device 2 can suppress adverse effects on the fundamental function relating to ordinary processing and an increase in the communication traffic of the network NW1.

The IoT device 2 generates comparison information (an example of the dynamic information) on the basis of a log that was output in the past and registers the generated comparison information as the dynamic list L3. The IoT device 2 decides not to output a generated log when the long coincides with the comparison information. With this measure, the IoT device 2 can prevent frequent output of logs that are similar in content to the comparison information registered as the dynamic list L3.

The IoT device 2 generates plural pieces of comparison information (an example of the dynamic information) and registers the generated plural pieces of comparison information as the dynamic list L3. With this measure, being capable of registering the dynamic list L3 including plural pieces of comparison information, the IoT device 2 can suppress output of logs including a content that coincides with one of the plural pieces of comparison information. Thus, the IoT device 2 can prevent frequent output of logs more certainly than in the case that only one piece of comparison information is registered.

The comparison information or each of the plural pieces of comparison information has a comparison condition including part of the contents of a log that was output in the past and frequency information indicating a frequency of generation of logs that cause coincidence with the comparison condition. With this measure, the IoT device 2 can judge, in detail and finely, the necessity of output of such a log using a comparison condition including part of the contents of a log that was output in the past and frequency information indicating a frequency of generation of logs including a content that coincides with the comparison condition. Thus, the IoT device 2 can effectively prevent output of logs having similar contents and generated frequently.

The frequency information has at least the number of times of occurrence of coincidence found between the generated log and the comparison condition. The IoT device 2 decides not to output the generated log if judging that the number of times of occurrence is smaller than a first preset value. With this measure, the IoT device 2 can make an output decision only once when logs including a content that coincides with the corresponding comparison condition have been generated a first preset number of times (e.g., 10 times). Thus, the IoT device 2 can suppress casual output of generated logs having similar contents.

The frequency information has at least an elapsed time from a time of generation of the log that causes coincidence with the comparison condition. The IoT device 2 decides not to output the generated log if judging that the elapsed time is shorter than a second preset value. With this measure, the IoT device 2 can prevent output of logs having similar contents if at least the second preset value (e.g., 10 minutes) has not elapsed from generation of a log including a content that coincides with the corresponding comparison condition. Thus, the IoT device 2 can reduce the number of output logs properly.

The frequency information has at least a generation time of the log that causes coincidence with the comparison condition. The IoT device 2 decides not to output the generated log if judging that an elapsed time from the generation time to the present time is shorter than a second preset value. With this measure, the IoT device 2 can prevent output of logs having similar contents if at least the second preset value (e.g., 10 minutes) has not elapsed from generation of a log including a content that coincides with the corresponding comparison condition. Thus, the IoT device 2 can reduce the number of output logs properly.

The flash memory 24 stores the restriction condition list L4 (an example of the fourth list) including plural restriction conditions to be used for judging the necessity of log output/non-output determination using the dynamic list L3. The IoT device 2 judges that log output/non-output determination should be made for the generated log using the dynamic list L3 when the long coincides with the restriction conditions. With this measure, the IoT device 2 can judge, in detail, the necessity of output of a certain type of generated log including a content that coincides with the restriction conditions using the dynamic list L3 instead of a simplified check using the restriction conditions.

The flash memory 24 stores the restriction condition list L4 (an example of the fourth list) including plural restriction conditions to be used for judging the necessity of log output/non-output determination using the dynamic list L3. The IoT device 2 decides to output or not to output the generated log by judging that log output/non-output determination should not be made using the dynamic list L3 for the log when the long coincides with the restriction conditions. With this measure, the IoT device 2 can judge, quickly, the necessity of output of a certain type of generated log including a content that coincides with the restriction conditions without making generated log output/non-output determination using the dynamic list L3.

The flash memory 24 further stores the priority condition list L5 (an example of the fifth list) including plural priority conditions for deleting comparison information. Pieces of comparison information are registered in the IoT device 2 in such a number as to be able to be registered as the dynamic list L3. When the generated log coincides with one of the plural priority conditions, the IoT device 2 deletes comparison information that cause coincidence with the coincidence-found priority condition. For example, a log that is generated by processing that is low in execution frequency is considered high in output priority. With this measure, the IoT device 2 can delete comparison information including a content of a log generated by processing that is executed at a high frequency when the comparison information coincides with the priority conditions, which can contribute to holding of meaningful pieces of comparison information to make it possible to suppress output of logs that are generated at high frequencies among a limited number of pieces of comparison information.

The flash memory 24 further stores the priority condition list L5 (an example of the fifth list) including plural priority conditions for not deleting comparison information. Pieces of comparison information are registered in the IoT device 2 in such a number as to be able to be registered as the dynamic list L3. When the generated log coincides with one of the plural priority conditions, the IoT device 2 does not delete comparison information that cause coincidence with the coincidence-found priority information. For example, a log that is generated by processing that is high in execution frequency is considered low in output priority. With this measure, the IoT device 2 can have comparison information remain, instead of deleting it, that includes a content of a log generated by processing that is executed at a high frequency when the comparison information coincides with the priority conditions, which can contribute to holding of meaningful pieces of comparison information to make it possible to suppress output of logs that are generated at high frequencies.

The IoT device 2 deletes the oldest piece of comparison information from the plural pieces of comparison information constituting the dynamic information. With this measure, since the frequency of execution of processing that satisfies the oldest piece of comparison information is low, by deleting unnecessary pieces of comparison information generated on the basis of such low-frequency processing the IoT device 2 can hold meaningful pieces of comparison information to make it possible to suppress output of logs of processing that is executed at a high frequency.

Each of the plural pieces of comparison information which constitute the dynamic information stored in the flash memory 24 has a frequency of occurrence indicating the number of times of occurrence of logs that satisfy the comparison information. The IoT device 2 deletes comparison information that is lowest in the frequency of occurrence from the plural pieces of comparison information constituting the dynamic information. With this measure, by deleting unnecessary pieces of comparison information generated on the basis of low-frequency processing, the IoT device 2 can hold meaningful pieces of comparison information to make it possible to suppress output of logs of processing that is executed at a high frequency.

Each of the plural pieces of comparison information which constitute the dynamic information stored in the flash memory 24 has a registration time when the comparison information was registered as part of the dynamic information. The IoT device 2 deletes the oldest piece of comparison information from the plural pieces of comparison information constituting the dynamic information. The registration time is updated when a log including a content that coincides with a comparison condition of the corresponding comparison information is generated. With this measure, by deleting unnecessary pieces of comparison information generated on the basis of low-frequency processing, the IoT device 2 can hold meaningful pieces of comparison information to make it possible to suppress output of logs of processing that is executed at a high frequency.

Although the various embodiments have been described above with reference to the drawings, it goes without saying that the disclosure is not limited to those examples. It is apparent that those skilled in the art could conceive various changes, modifications, replacements, additions, deletions, or equivalents within the confines of the claims, and they are naturally construed as being included in the technical scope of the disclosure. Constituent elements of the above-described embodiments can be combined in a desired manner without departing from the spirit and scope of the invention.

The present application is based on Japanese Patent Application No. 2018-164537 filed on Sep. 3, 2018, the disclosure of which is invoked herein by reference.

INDUSTRIAL APPLICABILITY

The present disclosure is useful in providing a log output device, a log output method, and a log output system which properly select logs to be reported to a SIEM service from logs generated as a processing history and thereby suppress adverse effects on a fundamental function relating to ordinary processing and a traffic increase of a communication network.

DESCRIPTION OF SYMBOLS

1: PC
2, 2-1, 2-n: IoT device
3: IPS
4: SIEM
5: SOC
21: ROM
22: RAM
23: Processor
24: Flash memory
25: Internal I/F
26: Operation unit
27: Network I/F
L1: Black list
L2: White list
L3: Dynamic list
L4: Restriction condition list
L5: Priority condition list
NW1, NW2: Network

The invention claimed is:

1. A log output device provided in an IoT (Internet of Things) device, which is connected to a SIEM (Security Information and Event Management) apparatus via a network, comprising:

a memory that stores instructions;

a processor, when executing the instructions stored in the memory, that performs operations including:

generating a log indicating history information of execution of processing, wherein the memory further stores a first list including first static information indicating that the processing is abnormal, a second list including second static information indicating that the processing is normal, a third list including dynamic information to be used for determining necessity of output of the log according to the log, and a fourth list including plural restriction conditions to be used for judging necessity of log output/non-output determination using the third list, wherein the processor further performs operations including:

determining that the generated log includes the first static information in the first list;

outputting, to the SIEM apparatus, the generated log that is determined to include the first static information;

determining that the generated log includes the second static information in the second list;

stopping output, to the SIEM apparatus, of the generated log that is determined to include the second static information;

determining that the generated log coincides with the restriction conditions in the fourth list;

judging that the log output/non-output determination using the third list is necessary for the generated log that is determined to coincide with the restriction conditions;

determining, based on the third list, the necessity of output, to the SIEM apparatus, of the generated log for which the log output/non-output determination using the third list is determined necessary; and stopping output, to the SIEM apparatus, of the generated log that is determined not to output to the SIEM apparatus based on the third list, wherein each of the plural restriction conditions in the fourth list is provided for a log type and includes a key character string associated with the log type, wherein the processor further performs operations including:

generating comparison information based on a log that has been output to the SIEM apparatus in the past;

registering the generated comparison information as the dynamic information; and determining not to output the generated log that coincides with the comparison information, wherein the comparison information includes a comparison condition including part of contents of the log that has been output to the SIEM apparatus in the past and frequency information indicating a frequency of generation of logs that coincide with the comparison condition, wherein:

the frequency information includes at least a number of times of occurrence of coincidence between the generated log and the comparison condition, and the processor determines not to output, to the SIEM apparatus, the generated log which is judged that the number of times of occurrence is smaller than a first preset value, wherein:

the memory further stores a fifth list including plural priority conditions for not deleting the comparison information, and when pieces of comparison information are registered in such a number as to be able to be registered as the dynamic information and the generated log coincides with one of the plural priority conditions, the processor does not delete the comparison information which coincides with the one of the plural priority conditions.

2. The log output device according to claim 1, wherein the processor generates plural pieces of comparison information and registers the generated plural pieces of comparison information as the dynamic information.

3. The log output device according to claim 2, wherein the processor deletes an oldest piece of comparison information from the plural pieces of comparison information constituting the dynamic information.

4. The log output device according to claim 2, wherein:

each of the plural pieces of comparison information includes a frequency of occurrence indicating a number of times of occurrence of logs that satisfy the comparison information; and the processor deletes a piece of comparison information that is lowest in the frequency of occurrence from the plural pieces of comparison information constituting the dynamic information.

5. The log output device according to claim 2, wherein:

each of the plural pieces of comparison information includes a registration time when the comparison information has been registered as part of the dynamic information; and the processor deletes an oldest piece of comparison information from the plural pieces of comparison information constituting the dynamic information.

6. The log output device according to claim 2, wherein each of the plural pieces of comparison information includes a comparison condition including part of contents of the log that has been output in the past and frequency information indicating a frequency of generation of logs that coincide with the comparison condition.

7. The log output device according to claim 1, wherein:
the frequency information includes at least an elapsed time from a time of generation of the log that coincides with the comparison condition; and
the processor determines not to output, to the SIEM apparatus, the generated log which is judged that the elapsed time is shorter than a second preset value.

8. The log output device according to claim 1, wherein:
the frequency information includes at least a generation time of the log that coincides with the comparison condition; and
the processor determines not to output, to the SIEM apparatus, the generated log which is judged that an elapsed time from the generation time to the present time is shorter than a second preset value.

9. The log output device according to claim 1, wherein:
the processor further determines to output or not to output the generated log to the SIEM apparatus, by judging that the log output/non-output determination using the third list is not necessary based on the restriction conditions in the fourth list.

10. The log output device according to claim 1, wherein:
the fifth list further includes plural priority conditions for deleting the comparison information; and
when pieces of comparison information are registered in such a number as to be able to be registered as the dynamic information and the generated log coincides with one of the plural priority conditions for deleting the comparison information, the processor deletes the comparison information which coincides with the one of the plural priority conditions for deleting the comparison information.

11. The log output device according to claim 1, wherein the processor determines that the generated log coincides with the restriction conditions in the fourth list, by
determining a log type of the generated log,
determining that the generated log includes a character string matching the key character string that is associated with the determined log type of the generated log in the restriction condition in the fourth list, and
determining that the generated log coincides with the restriction conditions, in response to determining that the generated log includes the character string matching the key character string.

12. A log output method employed in a log output device provided in an IoT (Internet of Things) device, which is connected to a SIEM (Security Information and Event Management) apparatus via a network, the log output method comprising:
generating a log indicating history information of execution of processing;
storing, in a memory, a first list including first static information indicating that the processing is abnormal, a second list including second static information indicating that the processing is normal, a third list including dynamic information to be used for determining necessity of output of the log according to the log, and a fourth list including plural restriction conditions to be used for judging necessity of log output/non-output determination using the third list;
determining that the generated log includes the first static information in the first list;
outputting, to the SIEM apparatus, the generated log that is determined to include the first static information;
determining that the generated log includes the second static information in the second list;
stopping output, to the SIEM apparatus, of the generated log that is determined to include the second static information;
determining that the generated log coincides with the restriction conditions in the fourth list;
judging that the log output/non-output determination using the third list is necessary for the generated log that is determined to coincide with the restriction conditions;
determining, based on the third list, the necessity of output, to the SIEM apparatus, of the generated log for which the log output/non-output determination using the third list is determined necessary; and
stopping output, to the SIEM apparatus, of the generated log that is determined not to output to the SIEM apparatus based on the third list,
wherein each of the plural restriction conditions in the fourth list is provided for a log type and includes a key character string associated with the log type,
wherein the log output method further comprises:
generating comparison information based on a log that has been output to the SIEM apparatus in the past;
registering the generated comparison information as the dynamic information; and
determining not to output the generated log that coincides with the comparison information,
wherein the comparison information includes a comparison condition including part of contents of the log that has been output to the SIEM apparatus in the past and frequency information indicating a frequency of generation of logs that coincide with the comparison condition,
wherein the frequency information includes at least a number of times of occurrence of coincidence between the generated log and the comparison condition,
wherein the log output method further comprises determining not to output, to the SIEM apparatus, the generated log which is judged that the number of times of occurrence is smaller than a first preset value,
wherein the log output method further comprises:
storing, in the memory, a fifth list including plural priority conditions for not deleting the comparison information; and
when pieces of comparison information are registered in such a number as to be able to be registered as the dynamic information and the generated log coincides with one of the plural priority conditions, not deleting the comparison information which coincides with the one of the plural priority conditions.

13. A log output system in which a log output device provided in an IoT (Internet of Things) device and a SIEM (Security Information and Event Management) server which analyzes a log sent from the log output device are communicable with each other, wherein the log output device comprises:
a memory that stores instructions;
a processor, when executing the instructions stored in the memory, that performs operations including:
generating a log indicating history information of execution of processing;
storing, in the memory, a first list including first static information indicating that the processing is abnormal, a second list including second static information indicating that the processing is normal, a third list including dynamic information to be used for determining necessity of output of the log according to the log, and a fourth list including plural restriction conditions to be used for judging necessity of log output/non-output determination using the third list;

determining that the generated log includes the first static information in the first list;

outputting, to the SIEM server, the generated log that is determined to include the first static information;

determining that the generated log includes the second static information in the second list;

stopping output, to the SIEM server, of the generated log that is determined to include the second static information;

determining that the generated log coincides with the restriction conditions in the fourth list;

judging that the log output/non-output determination using the third list is necessary for the generated log that is determined to coincide with the restriction conditions;

determining, based on the third list, the necessity of output to the SIEM server of the generated log for which the log output/non-output determination using the third list is determined necessary; and stopping output, to the SIEM server, of the generated log that is determined not to output to the SIEM server based on the third list, wherein each of the plural restriction conditions in the fourth list is provided for a log type and includes a key character string associated with the log type, wherein the processor further performs operations including:

generating comparison information based on a log that has been output to the SIEM apparatus in the past;

registering the generated comparison information as the dynamic information; and determining not to output the generated log that coincides with the comparison information, wherein the comparison information includes a comparison condition including part of contents of the log that has been output to the SIEM apparatus in the past and frequency information indicating a frequency of generation of logs that coincide with the comparison condition, wherein:

the frequency information includes at least a number of times of occurrence of coincidence between the generated log and the comparison condition; and the processor determines not to output, to the SIEM apparatus, the generated log which is judged that the number of times of occurrence is smaller than a first preset value, wherein:

the processor further stores, in the memory, a fifth list including plural priority conditions for not deleting the comparison information; and when pieces of comparison information are registered in such a number as to be able to be registered as the dynamic information and the generated log coincides with one of the plural priority conditions, the processor does not delete the comparison information which coincides with the one of the plural priority conditions.

* * * * *